United States Patent
Liu et al.

(10) Patent No.: US 11,131,225 B2
(45) Date of Patent: Sep. 28, 2021

(54) PHOSPHORUS RESISTANT THREE-WAY CATALYST

(71) Applicant: BASF Corporation, Florham Park, NJ (US)

(72) Inventors: Fudong Liu, Orlando, FL (US); Michel Deeba, East Brunswick, NJ (US)

(73) Assignee: BASF Corporation, Florham Park, NJ (US)

( * ) Notice: Subject to any disclaimer, the term of this patent is extended or adjusted under 35 U.S.C. 154(b) by 0 days.

(21) Appl. No.: 16/642,707

(22) PCT Filed: Aug. 27, 2018

(86) PCT No.: PCT/IB2018/056512
§ 371 (c)(1),
(2) Date: Feb. 27, 2020

(87) PCT Pub. No.: WO2019/043557
PCT Pub. Date: Mar. 7, 2019

(65) Prior Publication Data
US 2020/0232362 A1    Jul. 23, 2020

Related U.S. Application Data

(60) Provisional application No. 62/550,893, filed on Aug. 28, 2017.

(51) Int. Cl.
*F01N 3/10*    (2006.01)
*B01J 23/46*    (2006.01)
(Continued)

(52) U.S. Cl.
CPC ............ *F01N 3/101* (2013.01); *B01J 23/464* (2013.01); *B01J 35/04* (2013.01); *B01J 37/0244* (2013.01);
(Continued)

(58) Field of Classification Search
CPC ...... F01N 3/28; F01N 3/0857; F01N 2330/20; F01N 2570/08; B01J 23/464; B01J 37/0244
(Continued)

(56) References Cited

U.S. PATENT DOCUMENTS 4,674,447 A    6/1987    Davis
4,675,308 A    6/1987    Wan et al.
(Continued)

FOREIGN PATENT DOCUMENTS

EP    1854538 A1    11/2007
JP    2011161421 A    8/2011
(Continued)

OTHER PUBLICATIONS

International Search Report dated Dec. 19, 2018 in PCT/IB2018/056512 filed Aug. 27, 2018.
(Continued)

*Primary Examiner* — Tom P Duong
(74) *Attorney, Agent, or Firm* — Finnegan, Henderson, Farabow Garrett & Dunner LLP

(57) ABSTRACT

Described are three-way conversion (TWC) catalytic articles effective to abate hydrocarbons (HCs), carbon monoxide (CO), and nitrogen oxides ($NO_x$) from an engine exhaust gas containing phosphorous impurities. The disclosed catalytic article has a layered catalytic material, wherein the first layer of the catalytic material is disposed directly on the substrate and a second layer is disposed on top of the first layer. The second layer includes phosphorus resistant materials that prevent catalytic poisoning of the catalytic article by the phosphorous impurities. In particular, the second layer includes a phosphorus trap material having
(Continued)

an alkaline earth metal component and a rhodium component impregnated on a phosphorus-resistant support material.

21 Claims, 18 Drawing Sheets

(51) Int. Cl.
 *B01J 35/04* (2006.01)
 *B01J 37/02* (2006.01)
 *F01N 3/08* (2006.01)
 *B01J 21/04* (2006.01)
 *B01J 21/06* (2006.01)

(52) U.S. Cl.
 CPC ........ *B01J 37/0248* (2013.01); *F01N 3/0857* (2013.01); *B01J 21/04* (2013.01); *B01J 21/066* (2013.01); *F01N 2330/30* (2013.01); *F01N 2510/0684* (2013.01); *F01N 2570/08* (2013.01)

(58) Field of Classification Search
 USPC .................................................. 422/177, 180
 See application file for complete search history.

(56) References Cited

U.S. PATENT DOCUMENTS

| | | | |
|---|---|---|---|
| 4,678,770 | A | 7/1987 | Wan et al. |
| 4,738,947 | A | 4/1988 | Wan et al. |
| 5,696,065 | A | 12/1997 | Tanaka et al. |
| 5,857,326 | A | 1/1999 | Blanchet |
| 6,764,665 | B2 | 7/2004 | Deeba et al. |
| 7,240,482 | B2 | 7/2007 | Hepburn et al. |
| 7,678,347 | B2 | 3/2010 | Chen |
| 7,749,472 | B2 | 7/2010 | Chen et al. |
| 8,323,599 | B2 | 12/2012 | Nunan et al. |
| 8,394,348 | B1 | 3/2013 | Nunan et al. |
| 9,433,927 | B2 | 9/2016 | Ikeda et al. |
| 2003/0021745 | A1 | 1/2003 | Chen |
| 2007/0014705 | A1 | 1/2007 | Chen |
| 2008/0038172 | A1 | 2/2008 | Chen et al. |
| 2012/0128558 | A1* | 5/2012 | Nunan ............... B01D 53/9472 423/213.5 |
| 2015/0266014 | A1 | 9/2015 | Xue et al. |
| 2015/0367328 | A1 | 12/2015 | Ikeda et al. |

FOREIGN PATENT DOCUMENTS

| | | |
|---|---|---|
| JP | 5326790 B2 | 10/2013 |
| JP | 2015066516 A | 4/2015 |
| JP | 2015188881 A | 11/2015 |

OTHER PUBLICATIONS

U.S. Appl. No. 16/307,956, filed May 4, 2017, US 2019-0299192 A1, Gu, Y., et al.
U.S. Appl. No. 16/302,115, filed May 9, 2017, US 2019-0160427 A1, Deeba, M., et al.
U.S. Appl. No. 16/094,646, filed Feb. 28, 2017, US 2019-0105636 A1, Wang, X., et al.
U.S. Appl. No. 16/320,572, filed Jun. 15, 2017, US 2019-0240643 A1, Karpov, A., et al.
U.S. Appl. No. 16/481,574, filed Jan. 26, 2018, US 2019-0388838 A1, Luo, T., et al.
European Search Report for EP Patent Application No. 18850898.0, dated May 10, 2021, 3 pages.

* cited by examiner

Reference Catalyst

- Rh/La$_2$O$_3$-Al$_2$O$_3$ + Rh/La$_2$O$_3$-ZrO$_2$ + La$_2$O$_3$-Al$_2$O$_3$
- Pd/La$_2$O$_3$-Al$_2$O$_3$ + Pd/CeO$_2$-ZrO$_2$ + BaO
- Substrate

Invention Catalyst 1

- Rh/La$_2$O$_3$-Al$_2$O$_3$ + Rh/La$_2$O$_3$-ZrO$_2$ + BaO-Al$_2$O$_3$
- Pd/La$_2$O$_3$-Al$_2$O$_3$ + Pd/CeO$_2$-ZrO$_2$ + BaO
- Substrate

Invention Catalyst 2

- Rh/La$_2$O$_3$-ZrO$_2$ + BaO-Al$_2$O$_3$ + Rh/La$_2$O$_3$-Al$_2$O$_3$ + Rh/La$_2$O$_3$-ZrO$_2$ + La$_2$O$_3$-Al$_2$O$_3$
- Pd/La$_2$O$_3$-Al$_2$O$_3$ + Pd/CeO$_2$-ZrO$_2$ + BaO
- Substrate

FIG. 5

PHOSPHORUS RESISTANT THREE-WAY CATALYST

FIELD OF THE INVENTION

This invention is directed to catalyst compositions, catalytic articles for purifying exhaust gas emissions and methods of making and using the same. More particularly, the invention pertains to three-way conversion catalytic articles with enhanced phosphorus resistance to achieve efficient conversion of hydrocarbons, carbon monoxide, and nitrogen oxides.

BACKGROUND OF THE INVENTION

Catalysts in catalytic converters within exhaust gas treatment systems have been used to decrease the pollution caused by exhaust gas from internal combustion engines. For example, three-way conversion (TWC) catalysts are able to reduce pollutants such as carbon monoxide (CO), unburned hydrocarbons (HCs), and nitrogen oxides ($NO_x$) present in engine exhaust. TWC catalysts typically contain platinum group metals (PGM), such as, for example platinum (Pt), palladium (Pd), and rhodium (Rh). Pt and Pd are generally used for HC and CO conversion, while Rh is more effective for the reduction of $NO_x$.

Sometimes additives and lubricants are added to engine oil to form antiwear coatings on engine components and act as antioxidants in the oil. These additives and lubricants include compounds such as dialkylthiophosphates (ZDDPs), zinc dithiophosphates (ZDTPs), and zinc dithiocarbamates (ZDTCs). For additional phosphorous-containing additives and lubricants see, for example, U.S. Pat. Nos. 4,674,447 to Davis et al. and 5,696,065 to Kogyo et al., which are hereby incorporated by reference. Although engines are designed to minimize the quantity of engine oil escaping from the engine into the exhaust gas treatment system, it is inevitable that a small fraction of engine oil containing ZDDPs and/or their combustion by-products, e.g., phosphorus oxides ($PO_x$), are released into the exhaust gas stream. For example, oil leaking past the piston rings into the combustion chamber goes through the combustion process, generating phosphorus-containing combustion by-products. As another example, oil leaking past the exhaust valve guide and stem may not go through the combustion process, resulting in phosphorus-containing species that form a glaze layer over the catalysts. These released phosphorus-containing species deposit onto the catalyst components inside the catalytic converter, resulting in the deactivation of these catalyst components (e.g., TWC catalysts). This deactivation process is often referred to as catalyst poisoning. Although the additives and lubricants could be removed from the oil to address this concern, long-term durability of the engine could suffer.

Over time the catalytic activity of TWC catalysts exposed to such phosphorus-containing species declines. TWC catalysts may experience diffusion problems, PGM sintering, loss of oxygen storage capacity, deterioration of light-off performance, and a decrease in pollutant conversion including hydrocarbon (HC), carbon monoxide (CO) and nitrogen oxide ($NO_x$) conversion. In order to protect the catalysts inside the converter from exposure to the phosphorus-containing species, a guard (e.g., alumina) or filter may be installed in front of the catalyst components to prevent poisoning of the catalyst, e.g., by $PO_x$. However, difficulties are encountered when the guard or filter becomes saturated with $PO_x$. See, for example, U.S. Pat. Nos. 5,857,326 to Blanchet; 7,240,482 to Hepburn; 7,749,472 to Chen; and 9,433,927 to Ikeda for guards and filters to trap phosphorus, which are incorporated herein by reference in their entireties.

Fortunately, engine and exhaust gas treatment technologies have reduced the amount of oil, including phosphorous-containing species, passing from the combustion engine to the exhaust gas treatment system, enabling catalysts within the treatment system to remain sufficiently active in treating exhaust gases in accordance with various government regulations. However, as engine performance continues to increase and environmental regulations become more stringent, exhaust treatment catalyst activity will have to be increased and maintained with longer engine life. For example, it is common that the oil consumed by an engine increases as the mileage increases (e.g., >100,000 miles). Accordingly, there will be a greater amount of oil, including phosphorous-containing species passing to the emission treatment system catalysts from the engine.

Thus, there is a great need to provide catalysts that maintain functionality as both engine performance and lifespan increase and which are resistant to engine exhaust gas containing phosphorus-containing species. It would be highly desirable to provide a means whereby ZDDPs and their phosphorus-containing combustion by-products in engine exhaust can be effectively removed or sufficiently tolerated without requiring increased platinum group metal loading to compensate for reduced catalyst activity.

SUMMARY OF THE INVENTION

The invention relates to a three-way conversion (TWC) catalyst composition and catalytic article with enhanced resistance toward phosphorus-containing impurities present in engine exhaust gas. In particular, the TWC catalytic article of the invention contains a phosphorus trapping material to adsorb at least a portion of the phosphorus-containing impurities which would otherwise poison the TWC catalytic article. The TWC catalytic article of the invention also contains a phosphorus-resistant support material having catalytically active metals disposed thereon. Phosphorus-resistant support materials prevent the catalytically active metals from sintering when exposed to engine exhaust containing phosphorus impurities. Although not limited thereto the disclosed TWC composition of the invention is particularly effective in reducing poisoning of phosphorus-containing impurities when it is the first catalytic component within the catalytic converter exposed to the engine exhaust gas.

An aspect of the invention relates to a TWC catalytic article with enhanced phosphorus resistance comprising a catalytic material on a substrate, the catalytic material comprising a first layer disposed on the substrate and a second layer disposed on the first layer, wherein the second layer comprises: a phosphorus trap material comprising an alkaline earth metal component and a metal oxide, wherein the alkaline earth metal component is supported on the metal oxide or is in the form of a composite with the metal oxide, and a rhodium component impregnated on a phosphorus-resistant support material; and wherein the catalytic material is effective for three-way conversion to oxidize carbon monoxide and hydrocarbons and reduce nitrogen oxides.

In some embodiments, the phosphorus-resistant support material is a zirconia-based support material, e.g., zirconia, lanthana-zirconia, titania-zirconia, titania-lanthana-zirconia, alumina-zirconia, baria-zirconia, strontia-zirconia, neodymia-zirconia, praseodymia-zirconia, tungsten oxide-zirconia, niobia-zirconia, yttria-zirconia, or a combination thereof. In some specific embodiments, the zirconia-based support material is lanthana-zirconia. In some embodiments, the lanthana-zirconia comprises zirconia in an amount from about 80 to about 99 wt. %.

In some embodiments, the second layer contains the rhodium component in an amount from about 0.05 to about 5 wt. % based on the total weight of the second layer. In some embodiments, the alkaline earth metal component is selected from barium oxide, magnesium oxide, calcium oxide, strontium oxide, and combinations thereof. In some specific embodiments, the alkaline earth metal component is barium oxide.

In some embodiments, the second layer contains barium oxide in an amount from about 1 to about 40 wt. % based on the total weight of the second layer. In some embodiments, the metal oxide is alumina, zirconia, titania, ceria, or a combination thereof. In some particular embodiments, the metal oxide is alumina. In some embodiments, the phosphorus trap material is a composite of barium oxide and alumina.

In some embodiments, the TWC catalytic article further comprises a second rhodium component, wherein the second rhodium component is impregnated on a refractory metal oxide support. In some embodiments, the refractory metal oxide support is selected from alumina, lanthana-alumina, ceria-alumina, zirconia-alumina, ceria-zirconia-alumina, lanthana-zirconia-alumina, lanthana-neodymia alumina, and combinations thereof. In some specific embodiments, the refractory metal oxide support is lanthana-alumina. In other such embodiments, the second rhodium component is impregnated on ceria-zirconia, lanthana-ceria-zirconia, neodymia-ceria-zirconia, praseodymia-ceria-zirconia, yttria-ceria-zirconia, niobia-ceria-zirconia, strontia-ceria-zirconia, or a combination thereof.

In some embodiments, the first layer comprises a platinum group metal (PGM) component impregnated on a first support material. In some embodiments, at least a portion of the first support material is an oxygen storage component selected from ceria, zirconia, lanthana, yttria, neodymia, praseodymia, niobia, and combinations thereof. In some embodiments, the oxygen storage component is ceria-zirconia comprising ceria in an amount from about 5 to about 75 wt. %. In some embodiments, at least a portion of the first support material is a refractory metal oxide support selected from alumina, lanthana-alumina, ceria-alumina, zirconia-alumina, ceria-zirconia-alumina, lanthana-zirconia-alumina, lanthana-neodymia-alumina, and combinations thereof. In some embodiments, the PGM component is palladium. In some embodiments, the first layer further comprises barium oxide, magnesium oxide, calcium oxide, strontium oxide, lanthanum oxide, cerium oxide, zirconium oxide, manganese oxide, copper oxide, iron oxide, praseodymium oxide, yttrium oxide, neodymium oxide, or a combination thereof.

In some embodiments, the second layer is a physical mixture of the phosphorus trap material and the rhodium component impregnated on the phosphorus-resistant support material. In some embodiments, the second layer contains the alkaline earth metal component in an amount of about 1 to about 20 wt. % based on the total weight of the second layer. In some embodiments, the phosphorus-resistant support material is lanthana-zirconia, and the alkaline earth metal component is barium oxide, wherein the barium oxide is supported on alumina or is a barium oxide-alumina composite. In some embodiments, the first layer comprises palladium impregnated on ceria-zirconia and lanthana-alumina, and wherein the first layer further comprises barium oxide.

In some embodiments, the second layer is zoned into an upstream zone and a downstream zone, and wherein the upstream zone comprises the phosphorus trap material. In some embodiments, the upstream zone has a length of about 20 to about 60% that of the substrate. In some embodiments, the substrate is a metal or ceramic monolithic honeycomb substrate, e.g., a wall flow filter substrate or a flow through substrate. In some embodiments, the catalytic material is coated on one or more walls or contained within one or more walls of the metal or ceramic monolithic honeycomb substrate.

Another aspect of the invention relates to a method for reducing CO, HC, and $NO_x$ levels in a gas stream, comprising contacting the gas stream with the TWC catalytic article disclosed therein for a time and at a temperature sufficient to reduce the levels of CO, HC, and $NO_x$ in the gas stream. In some embodiments, the CO, HC, and $NO_x$ levels in the gas stream are reduced by at least 50% compared to the CO, HC, and $NO_x$ levels in the gas stream prior to contact with the TWC catalytic article.

Another aspect of the invention relates to an emission treatment system for treatment of an exhaust gas stream, the emission treatment system comprising: an engine producing an exhaust gas stream; and the TWC catalytic article of the invention positioned downstream from the engine in fluid communication with the exhaust gas stream and adapted for the abatement of CO and HC and conversion of $NO_x$ to $N_2$. In some embodiments, the engine is a mobile source. For example, the engine can be a gasoline engine or a Compressed Natural Gas (CNG) engine. As such, in some embodiments, the mobile source is a gasoline car, a gasoline motorcycle, a CNG car, or a CNG motorcycles. In some embodiments, the stationary source comprises an electricity generator or a pumping station.

The invention includes, without limitation, the following embodiments.

Embodiment 1. A TWC catalytic article with enhanced phosphorus resistance comprising a catalytic material on a substrate, the catalytic material comprising a first layer disposed on the substrate and a second layer disposed on the first layer, wherein the second layer comprises a phosphorus trap material comprising an alkaline earth metal component and a metal oxide, wherein the alkaline earth metal component is supported on the metal oxide or is in the form of a composite with the metal oxide, and a rhodium component impregnated on a phosphorus-resistant support material; and wherein the catalytic material is effective for three-way conversion to oxidize carbon monoxide and hydrocarbons and reduce nitrogen oxides.

Embodiment 2. The TWC catalytic article of the preceding embodiment, wherein the phosphorus-resistant support material is a zirconia-based support material.

Embodiment 3. The TWC catalytic article of any preceding embodiment, wherein the zirconia-based support material is zirconia, lanthana-zirconia, titania-zirconia, titania-lanthana-zirconia, alumina-zirconia, baria-zirconia, strontia-zirconia, neodymia-zirconia, praseodymia-zirconia, tungsten oxide-zirconia, niobia-zirconia, yttria-zirconia, or any combination thereof.

Embodiment 4. The TWC catalytic article of any preceding embodiment, wherein the zirconia-based support material is lanthana-zirconia.

Embodiment 5. The TWC catalytic article of any preceding embodiment, wherein the lanthana-zirconia comprises zirconia in an amount from about 80 to about 99 wt. %.

Embodiment 6. The TWC catalytic article of any preceding embodiment, wherein the second layer contains the rhodium component in an amount from about 0.05 to about 5 wt. %.

Embodiment 7. The TWC catalytic article of any preceding embodiment, wherein the alkaline earth metal component is selected from barium oxide, magnesium oxide, calcium oxide, strontium oxide, and combinations thereof.

Embodiment 8. The TWC catalytic article of any preceding embodiment, wherein the alkaline earth metal component is barium oxide.

Embodiment 9. The TWC catalytic article of any preceding embodiment, wherein the second layer contains the barium oxide in an amount from about 1 to about 40 wt. %.

Embodiment 10. The TWC catalytic article of any preceding embodiment, wherein the metal oxide is alumina, zirconia, titania, ceria, or a combination thereof.

Embodiment 11. The TWC catalytic article of any preceding embodiment, wherein the metal oxide is alumina.

Embodiment 12. The TWC catalytic article of any preceding embodiment, wherein the phosphorus trap material is a composite of barium oxide and alumina.

Embodiment 13. The TWC catalytic article of any preceding embodiment, further comprising a second rhodium component, wherein the second rhodium component is impregnated on a refractory metal oxide support selected from alumina, lanthana-alumina, ceria-alumina, zirconia-alumina, ceria-zirconia-alumina, lanthana-zirconia-alumina, lanthana-neodymia alumina, and combinations thereof.

Embodiment 14. The TWC catalytic article of any preceding embodiment, wherein the refractory metal oxide support is lanthana-alumina.

Embodiment 15. The TWC catalytic article of any preceding embodiment, further comprising a second rhodium component impregnated on ceria-zirconia, lanthana-ceria-zirconia, neodymia-ceria-zirconia, praseodymia-ceria-zirconia, yttria-ceria-zirconia, niobia-ceria-zirconia, strontia-ceria-zirconia, or a combination thereof.

Embodiment 16. The TWC catalytic article of any preceding embodiment, wherein the first layer comprises a platinum group metal (PGM) component impregnated on a first support material.

Embodiment 17. The TWC catalytic article of any preceding embodiment, wherein at least a portion of the first support material is an oxygen storage component selected from ceria, zirconia, lanthana, yttria, neodymia, praseodymia, niobia, and combinations thereof.

Embodiment 18. The TWC catalytic article of any preceding embodiment, wherein the oxygen storage component is ceria-zirconia comprising ceria in an amount from about 5 to about 75 wt. %.

Embodiment 19. The TWC catalytic article of any preceding embodiment, wherein at least a portion of the first support material is a refractory metal oxide support selected from alumina, lanthana-alumina, ceria-alumina, zirconia-alumina, ceria-zirconia-alumina, lanthana-zirconia-alumina, lanthana-neodymia-alumina, and combinations thereof.

Embodiment 20. The TWC catalytic article of any preceding embodiment, wherein the PGM component is palladium.

Embodiment 21. The TWC catalytic article of any preceding embodiment, wherein the first layer further comprises barium oxide, magnesium oxide, calcium oxide, strontium oxide, lanthanum oxide, cerium oxide, zirconium oxide, manganese oxide, copper oxide, iron oxide, praseodymium oxide, yttrium oxide, neodymium oxide, or any combination thereof.

Embodiment 22. The TWC catalytic article of any preceding embodiment, wherein the second layer is a physical mixture of the phosphorus trap material and the rhodium component impregnated on the phosphorus-resistant support material.

Embodiment 23. The TWC catalytic article of any preceding embodiment, wherein the alkaline earth metal component is present in an amount of about 1 to about 20 wt. % of the second layer.

Embodiment 24. The TWC catalytic article of any preceding embodiment, wherein the phosphorus-resistant support material is lanthana-zirconia, and the alkaline earth metal component is barium oxide, wherein the barium oxide is supported on alumina or is in the form of a barium oxide-alumina composite.

Embodiment 25. The TWC catalytic article of any preceding embodiment, wherein the first layer comprises palladium impregnated on ceria-zirconia and lanthana-alumina, and wherein the first layer further comprises barium oxide.

Embodiment 26. The TWC catalytic article of any preceding embodiment, wherein the second layer is zoned into an upstream zone and a downstream zone, and wherein the upstream zone comprises the phosphorus trap material.

Embodiment 27. The TWC catalytic article of any preceding embodiment, wherein the upstream zone has a length of about 20 to about 60% that of the substrate.

Embodiment 28. The TWC catalytic article of any preceding embodiment, wherein the substrate is a metal or ceramic monolithic honeycomb substrate.

Embodiment 29. The TWC catalytic article of any preceding embodiment, wherein the metal or ceramic monolithic honeycomb substrate is a wall flow filter substrate or a flow through substrate.

Embodiment 30. The TWC catalytic article of any preceding embodiment, wherein the catalytic material is coated on one or more walls or contained within one or more walls of the metal or ceramic monolithic honeycomb substrate.

Embodiment 31. A method for reducing CO, HC, and $NO_x$ levels in a gas stream, comprising contacting the gas stream with the TWC catalytic article of any preceding embodiment for a time and at a temperature sufficient to reduce the levels of CO, HC, and $NO_x$ in the gas stream.

Embodiment 32. The method of any preceding embodiment, wherein the CO, HC, and $NO_x$ levels in the gas stream are reduced by at least 50% compared to the CO, HC, and $NO_x$ levels in the gas stream prior to contact with the TWC catalytic article.

Embodiment 33. An emission treatment system for treatment of an exhaust gas stream, the emission treatment system comprising an engine producing an exhaust gas stream; and the TWC catalytic article of any preceding embodiment positioned downstream from the engine in fluid communication with the exhaust gas stream and adapted for the abatement of CO and HC and conversion of $NO_x$ to $N_2$.

Embodiment 34. The emission treatment system of the preceding embodiment, wherein the engine is a gasoline engine or Compressed Natural Gas (CNG) engine.

Embodiment 35. The emission treatment system of any preceding embodiment, wherein the engine is a mobile source.

Embodiment 36. The emission treatment system of any preceding embodiment, wherein the mobile source is selected from a gasoline car, a gasoline motorcycle, a CNG car, or a CNG motorcycle.

Embodiment 37. The emission treatment system of any preceding embodiment, wherein the engine is a stationary source.

Embodiment 38. The emission treatment system of any preceding embodiment, wherein the stationary source is an electricity generator or a pumping station.

These and other features, aspects, and advantages of the disclosure will be apparent from a reading of the following detailed description together with the accompanying drawings, which are briefly described below. The invention includes any combination of two, three, four, or more of the above-noted embodiments as well as combinations of any two, three, four, or more features or elements set forth in this disclosure, regardless of whether such features or elements are expressly combined in a specific embodiment description herein. This disclosure is intended to be read holistically such that any separable features or elements of the disclosed invention, in any of its various aspects and embodiments, should be viewed as intended to be combinable unless the context clearly dictates otherwise. Other aspects and advantages of the present invention will become apparent from the following.

BRIEF DESCRIPTION OF THE DRAWINGS

In order to provide an understanding of embodiments of the invention, reference is made to the appended drawings, which are not necessarily drawn to scale, and in which reference numerals refer to components of exemplary embodiments of the invention. The drawings are exemplary only, and should not be construed as limiting the invention.

FIG. 5 shows a series of different catalytic articles in a layered and/or zoned configuration;

DETAILED DESCRIPTION OF THE INVENTION

Figure 1:
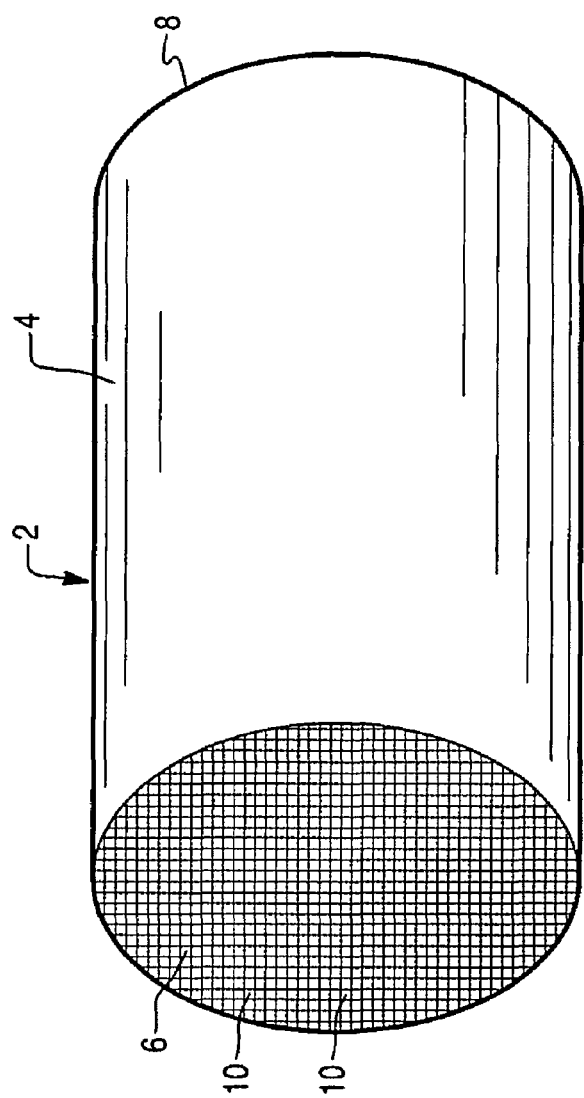
FIG. 1 is a perspective view of a honeycomb-type substrate which may comprise a TWC catalytic article in accordance with the present invention.

The present invention now will be described more fully hereinafter. This invention may, however, be embodied in many different forms and should not be construed as limited to the embodiments set forth herein; rather, these embodiments are provided so that this disclosure will be thorough and complete, and will fully convey the scope of the invention to those skilled in the art. As used in this specification and the claims, the singular forms "a," "an," and "the" include plural referents unless the context clearly dictates otherwise.

The current invention relates to a catalytic composition and a three-way conversion (TWC) catalytic article incorporating such a composition with enhanced phosphorus resistance. The TWC catalytic article of the invention comprises a catalytic material on a substrate, wherein the catalytic material comprises a first layer disposed on the substrate and a second layer disposed on the first layer. The first layer can comprise any catalyst composition known in the art for the conversion of one or more pollutants selected from HC, CO and $NO_x$. For examples of catalyst compositions for the first layer, see U.S. Pat. No. 6,764,665 to Deeba et al., which is incorporated by reference herein in its entirety. For example, in some embodiments, the first layer comprises a PGM-containing catalyst composition, wherein a PGM component (e.g., Pd) is impregnated on a support material (e.g., a refractory metal oxide material and/or an oxygen storage component).

The second layer of catalytic material is a rhodium-containing catalyst composition. The rhodium-containing catalyst composition includes a phosphorus trap material and a rhodium component, wherein the rhodium component is impregnated on a phosphorus resistant support material. The phosphorus resistant support material comprises a zirconia-based support material (e.g., lanthana-zirconia), which exhibits increased resistance towards phosphorus poisoning when exposed to an exhaust gas stream with phosphorous-containing species such as $PO_x$. The phosphorus trap material comprises an alkaline earth metal component (e.g., BaO) that is either supported on a metal oxide (e.g., alumina) or is in the form of a composite with a metal oxide. The purpose of the phosphorus trap is to permanently remove phosphorus-containing species from the engine exhaust by irreversibly binding such phosphorus-containing species, thereby reducing poisoning of the catalyst.

As used herein, the term "catalyst" or "catalyst composition" refers to a material that promotes a reaction.

As used herein, the terms "upstream" and "downstream" refer to relative directions according to the flow of an engine exhaust gas stream from an engine towards a tailpipe, with the engine in an upstream location and the tailpipe and any pollution abatement articles such as filters and catalysts being downstream from the engine.

As used herein, the term "stream" broadly refers to any combination of flowing gas that may contain solid or liquid particulate matter. The term "gaseous stream" or "exhaust gas stream" means a stream of gaseous constituents, such as the exhaust of a combustion engine, which may contain entrained non-gaseous components such as liquid droplets, solid particulates, and the like. The exhaust gas stream of a combustion engine typically further comprises combustion products ($CO_2$ and $H_2O$), products of incomplete combustion (carbon monoxide (CO) and hydrocarbons (HC)), oxides of nitrogen ($NO_x$), combustible and/or carbonaceous particulate matter (soot), and un-reacted oxygen and nitrogen.

As used herein, the term "substrate" refers to the monolithic material onto which the catalyst composition is placed.

As used herein, the term "support" refers to any high surface area material, usually a metal oxide material, upon which a catalytic precious metal is applied.

As used herein, the term "washcoat" has its usual meaning in the art of a thin, adherent coating of a catalytic or other material applied to a substrate material, such as a honeycomb-type carrier member, which is sufficiently porous to permit the passage of the gas stream being treated. A washcoat is formed by preparing a slurry containing a certain solid content (e.g., 30%-90% by weight) of particles in a liquid vehicle, which is then coated onto a substrate and dried to provide a washcoat layer.

As used herein, the term "catalytic article" refers to an element that is used to promote a desired reaction. For example, a catalytic article may comprise a washcoat containing catalytic compositions on a substrate.

As used herein, "impregnated" or "impregnation" refers to permeation of the catalytic material into the porous structure of the support material.

The term "abatement" means a decrease in the amount, caused by any means.

Catalytic Material

The catalytic material of the invention includes two catalyst compositions, which can be disposed onto a substrate in a layered configuration to generate a TWC catalytic article. For example, a catalytic article of the invention generally includes a first layer disposed directly on the substrate and a second layer disposed on top of the first layer. The first layer of the catalytic material can contain any catalyst composition known in the art for the conversion of HC, CO and/or $NO_x$ (referred to herein as "the platinum group metal (PGM)-containing catalyst composition"), and the catalyst composition of the second layer contains one or more catalytic components with phosphorus resistant properties (referred to herein as the "rhodium-containing catalyst composition") as described more fully herein below.

Rhodium-Containing Catalyst Composition

The rhodium-containing catalyst composition comprises at least one rhodium component and a phosphorus trap material. The rhodium component is selected from rhodium metal, rhodium oxides, and combinations thereof. In some embodiments, the rhodium component is impregnated on a phosphorus-resistant support material. A phosphorus-resistant support material as used herein is a metal oxide-containing material exhibiting chemical and physical stability toward phosphorus species present in engine exhaust. In some embodiments, the phosphorus-resistant support material is a zirconia-based support material. A zirconia-based support material may comprise zirconia in an amount ranging from about 50 to about 99 wt. %, from about 60 to about 99 wt. %, from about 70 to about 99 wt. %, from about 80 to about 99 wt. %, or from about 90 to about 99 wt. %. In some embodiments, the zirconia-based support material is zirconia modified with an oxide(s) of an alkali metal, a semimetal, a Group III metal, and/or a transition metal, e.g., La, Mg, Ba, Sr, Zr, Ti, Si, Ce, Mn, Nd, Pr, Sm, Nb, W, Y, Nd, Mo, Fe, Al, or combinations thereof. In some embodiments, the amount of alkali metal, semimetal, Group III metal, and/or transition metal oxide(s) used to modify the zirconia-based support material can range from about 0.5% to about 50% by weight based on the amount of zirconia-based material. Exemplary of zirconia-based support materials include lanthana-zirconia, titania-zirconia, titania-lanthana-zirconia, alumina-zirconia, baria-zirconia, strontia-zirconia, neodymia-zirconia, praseodymia-zirconia, tungsten oxide-zirconia, niobia-zirconia, yttria-zirconia, or a combination thereof. In some embodiments, the phosphorus-resistant support material is zirconia.

In some embodiments, the rhodium-containing catalyst composition comprises two or more rhodium components, wherein the rhodium components can be the same or different and wherein the rhodium components are on support materials that are the same or different. Typically one such rhodium component is as outlined above and the other rhodium component can vary. For example, in some embodiments, the composition further comprises a rhodium component supported on a ceria-based support material selected from ceria-zirconia, neodymia-ceria-zirconia, lanthana-ceria-zirconia, praseodymia-ceria-zirconia, yttria-ceria-zirconia, niobia-ceria-zirconia, strontia-ceria-zirconia, and combinations thereof. In some embodiments, the composition further comprises a rhodium component supported on a refractory metal oxide. As used herein, "refractory metal oxide material" refers to a metal-containing oxide material exhibiting chemical and physical stability at high temperatures, such as the temperatures associated with gasoline or compressed natural gas engine exhaust. Exemplary refractory metal oxide materials include alumina, silica, zirconia, titania, ceria, and physical mixtures or chemical combinations thereof, including atomically-doped combinations. In some embodiments, a refractory metal oxide material is a refractory metal oxide material modified with a metal oxide(s) of an alkali metal, a semimetal, and/or a transition metal, e.g., La, Mg, Ba, Sr, Zr, Ti, Si, Ce, Mn, Nd, Pr, Sm, Nb, W, Y, Nd, Mo, Fe, or combinations thereof. In some embodiments, the amount of alkali metal, semimetal, and/or transition metal oxide(s) used to modify the refractory metal oxide material can range from about 0.5% to about 50% by weight based on the amount of refractory metal oxide material. In one or more embodiments, the rhodium-containing catalyst composition comprises two rhodium components in a weight ratio of about 0.1:10 to about 10:0.1 based on the total weight of the rhodium components. Exemplary combinations of refractory metal oxide materials include zirconia-stabilized alumina, zirconia-alumina, ceria-zirconia-alumina, lanthana-alumina, lanthana-zirconia-alumina, lanthana-neodymia-alumina, and ceria-alumina. In some specific embodiments, the refractory metal oxide material is lanthana-alumina. For rhodium-containing catalyst compositions containing two or more rhodium components, it is understood that the refractory metal oxide supported rhodium component is different than the phosphorus-resistant material supported rhodium component (e.g., as the support materials are different and, optionally, the specific rhodium components are different).

In some embodiments, high surface area refractory metal oxide materials are used, such as alumina support materials, also referred to as "gamma alumina" or "activated alumina," which typically exhibit a BET surface area in excess of 60 $m^2/g$, often up to about 200 $m^2/g$ or higher. "BET surface area" has its usual meaning of referring to the Brunauer, Emmett, Teller method for determining surface area by $N_2$ adsorption. In one or more embodiments the BET surface area ranges from about 100 to about 150 $m^2/g$. Useful commercial alumina includes high surface area alumina, such as high bulk density gamma-alumina, and low or medium bulk density large pore gamma-alumina.

The concentration of the rhodium component(s) can vary, but will typically be from about 0.05 wt. % to about 5 wt. %, from about 0.1 to about 3 wt. %, or from about 0.5 to about 2.5 wt. % relative to the weight of the support materials impregnated thereon. The amount of rhodium component can vary. For example, the amount of the rhodium component can be about 0.1-10% by weight based on the total weight of the rhodium-containing catalyst composition.

The phosphorus trap material in the rhodium-containing catalyst composition can be any material that is able to remove undesired phosphorus species from engine exhaust by binding (e.g., permanently binding) the undesired phosphorus-containing species. For example, in some embodiments, the phosphorus trap material is an alkaline earth metal component supported on a metal oxide or an alkaline earth metal component in the form of a composite with a metal oxide. As used herein, an "alkaline earth metal component" is an alkaline earth metal or an oxide thereof, such as magnesium (Mg), calcium (Ca), strontium (Sr), barium (Ba), oxides thereof, and mixtures thereof. In some embodiments, the alkaline earth metal component is barium oxide (BaO). The concentration of the alkaline earth metal component present in the phosphorus trap material can vary, but will typically be from about 1 to about 50 wt. %, from about 1 to about 40 wt. %, from about 1 to about 30 wt. %, or from about 1 to about 20 wt. % based on the total weight of the phosphorus trap material. The metal oxide associated with the phosphorus trap material is an oxide of a metal other than an alkaline earth metal, e.g., selected from transition metals, Group III metals, lanthanides, and combinations thereof. Exemplary metal oxides are alumina, zirconia, titania, ceria, or a combination thereof. In some embodiments, the amount of the alkaline earth metal component present in the rhodium-containing catalyst composition can vary. For example, the amount of the alkaline earth metal component in the rhodium-containing catalyst composition can comprise about 1 to about 60% by weight based on the total weight of rhodium-containing catalyst composition.

In some embodiments, the rhodium-containing catalyst composition comprises a physical mixture of a phosphorus trap material with the rhodium component impregnated on the phosphorus-resistant support material. In some embodiments, the amount of rhodium component can vary. In one specific embodiment, the rhodium-containing catalyst composition comprises a phosphorus trap material comprising barium oxide supported on alumina and a rhodium component impregnated on lanthana-zirconia.

Platinum Group Metal (PGM)-Containing Catalyst Composition

The PGM-containing catalyst composition comprises a platinum group metal component, wherein "platinum group metal component" or "PGM component" refers to a platinum group metal or an oxide thereof, such as palladium (Pd), platinum (Pt), ruthenium (Ru), rhodium (Rh), osmium (Os), iridium (Ir), oxides, or mixtures thereof. In some embodiments, the platinum group metal component is palladium (Pd). In some embodiments, the PGM component is impregnated onto a porous support material selected from a refractory metal oxide material, an oxygen storage component, and combinations thereof. In some embodiments, at least a portion of the support material is a refractory metal oxide material. In some embodiments, at least a portion of the support material is an oxygen storage component (OSC). As used herein, "OSC" refers to an oxygen storage component that exhibits an oxygen storage capability and often is an entity that has multi-valent oxidation states and can actively react with oxidants such as oxygen ($O_2$) or nitric oxides ($NO_2$) under oxidative conditions, or reacts with reductants such as carbon monoxide (CO), hydrocarbons (HC), or hydrogen ($H_2$) under reduction conditions. Certain exemplary OSCs are rare earth metal oxides, which are oxides of scandium, yttrium, and/or the lanthanum series defined in the Periodic Table of Elements. Examples of suitable oxygen storage components include ceria and praseodymia and combinations thereof.

In some embodiments, the oxygen storage component comprises ceria. In some embodiments, the OSC comprises ceria in combination with one or more other materials including, for example, zirconium (Zr), titanium (Ta), lanthanum (La), praseodymium (Pr), neodymium (Nd), niobium (Nb), yttrium (Y), nickel (Ni), manganese (Mn), iron (Fe) copper (Cu), silver (Ag), gold (Au), samarium (Sm), gadolinium (Gd), and combinations comprising at least one of the foregoing metals. Various oxides (e.g., the metal in combination with oxygen (O)) may also be used, including, for example, zirconium oxide ($ZrO_2$), titania ($TiO_2$), praseodymia ($Pr_6O_{11}$), yttria ($Y_2O_3$), neodymia ($Nd_2O_3$), lanthana ($La_2O_3$), gadolinium oxide ($Gd_2O_3$), or mixtures comprising at least one of the foregoing.

Such combinations may be referred to as mixed oxide composites. For example, a "ceria-zirconia composite" means a composite comprising ceria and zirconia, without specifying the amount of either component. Suitable ceria-zirconia composites include, but are not limited to, composites having a ceria content ranging from about 5% to about 95%, preferably from about 5% to about 75%, more preferably from about 10% to about 70% by weight of the total ceria-zirconia composite (e.g., at least about 5%, at least about 15%, at least 30%, at least 40%, at least 50%, at least 60%, at least 70%, at least 80%, at least 90%, or at least about 95% ceria content with an upper boundary of 100%).

The concentration of the PGM component (e.g., Pd) can vary, but will typically be from about 0.1 wt. % to about 10 wt. % relative to the weight of the support material impregnated thereon. The amount of the PGM component (e.g., Pd) in the PGM component-containing catalyst composition can vary. For example, the amount of the PGM component in the PGM-containing catalyst composition can comprise about 0.1 to about 10% by weight based on the total weight of the PGM component-containing catalyst composition. In some embodiments, the PGM-containing catalyst composition further comprises a metal oxide selected from barium oxide, magnesium oxide, calcium oxide, strontium oxide, lanthanum oxide, cerium oxide, zirconium oxide, manganese oxide, copper oxide, iron oxide, praseodymium oxide, yttrium oxide, neodymium oxide, and combinations thereof. The amount of metal oxide can vary, but will typically be from about 1 wt. % to about 20 wt. %. In some embodiments, the metal oxide is physically mixed with the PGM component-impregnated support material present in the PGM-containing catalyst composition.

Catalytic Article

According to one or more embodiments, the substrate of the catalytic article of the invention may be constructed of any material typically used for preparing automotive catalysts and typically comprises a metal or ceramic monolithic honeycomb structure. The substrate typically provides a plurality of wall surfaces upon which washcoats comprising the catalyst compositions described herein are applied and adhered, thereby acting as a carrier for the catalyst compositions.

Exemplary metallic substrates include heat resistant metals and metal alloys, such as titanium and stainless steel as well as other alloys in which iron is a substantial or major component. Such alloys may contain one or more of nickel, chromium, and/or aluminum, and the total amount of these metals may advantageously comprise at least 15 wt. % of the alloy, e.g., 10-25 wt. % of chromium, 3-8 wt. % of aluminum, and up to 20 wt. % of nickel. The alloys may also contain small or trace amounts of one or more other metals, such as manganese, copper, vanadium, titanium and the like. The surface of the metal substrate may be oxidized at high temperatures, e.g., 1000° C. and higher, to form an oxide layer on the surface of the substrate, improving the corrosion resistance of the alloy and facilitating adhesion of the washcoat layer to the metal surface.

Ceramic materials used to construct the substrate may include any suitable refractory material, e.g., cordierite, mullite, cordierite-α alumina, silicon nitride, zircon mullite, spodumene, alumina-silica magnesia, zircon silicate, sillimanite, magnesium silicates, zircon, petalite, α alumina, aluminosilicates and the like.

Any suitable substrate may be employed, such as a monolithic flow-through substrate having a plurality of fine, parallel gas flow passages extending from an inlet to an outlet face of the substrate such that passages are open to fluid flow. The passages, which are essentially straight paths from the inlet to the outlet, are defined by walls on which the catalytic material is coated as a washcoat so that the gases flowing through the passages contact the catalytic material. The flow passages of the monolithic substrate are thin-walled channels which can be of any suitable cross-sectional shape, such as trapezoidal, rectangular, square, sinusoidal, hexagonal, oval, circular, and the like. Such structures may contain from about 60 to about 1200 or more gas inlet openings (i.e., "cells") per square inch of cross section (cpsi), more usually from about 300 to 600 cpsi. The wall thickness of flow-through substrates can vary, with a typical range being between 0.002 and 0.1 inches. A representative commercially-available flow-through substrate is a cordierite substrate having 400 cpsi and a wall thickness of 6 mil, or 600 cpsi and a wall thickness of 4 mil. However, it will be understood that the invention is not limited to a particular substrate type, material, or geometry.

In alternative embodiments, the substrate may be a wall-flow substrate, wherein each passage is blocked at one end of the substrate body with a non-porous plug, with alternate passages blocked at opposite end-faces. This requires that gas flow through the porous walls of the wall-flow substrate to reach the exit. Such monolithic substrates may contain up to about 700 or more cpsi, such as about 100 to 400 cpsi and more typically about 200 to about 300 cpsi. The cross-sectional shape of the cells can vary as described above. Wall-flow substrates typically have a wall thickness between 0.002 and 0.1 inches. A representative commercially available wall-flow substrate is constructed from a porous cordierite, an example of which has 200 cpsi and 10 mil wall thickness or 300 cpsi with 8 mil wall thickness, and wall porosity between 45-65%. Other ceramic materials such as aluminum-titanate, silicon carbide and silicon nitride are also used a wall-flow filter substrates. However, it will be understood that the invention is not limited to a particular substrate type, material, or geometry. Note that where the substrate is a wall-flow substrate, the catalyst composition can permeate into the pore structure of the porous walls (i.e., partially or fully occluding the pore openings) in addition to being disposed on the surface of the walls.

Figure 2:
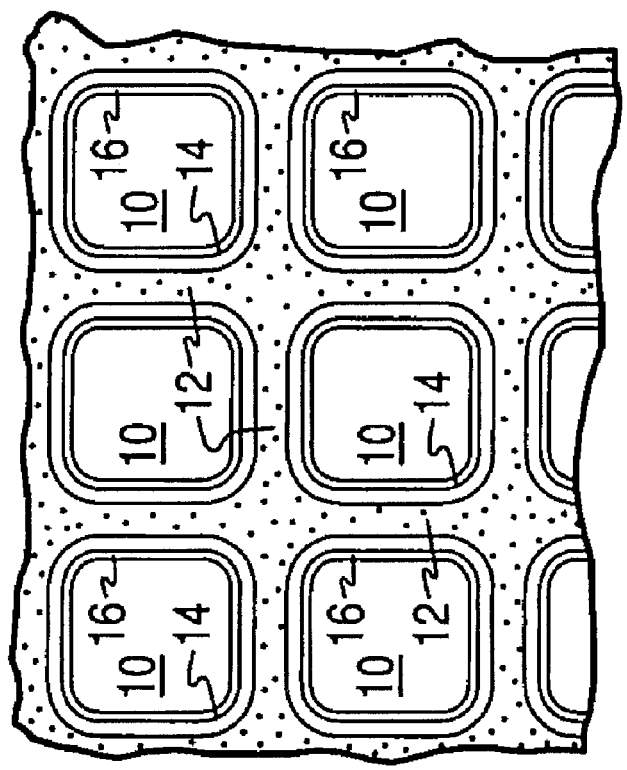
FIG. 2 is a partial cross-sectional view enlarged relative to FIG. 1 and taken along a plane parallel to the end faces of the substrate of FIG. 1 representing a monolithic flow-through substrate, which shows an enlarged view of a plurality of the gas flow passages shown in FIG. 1.

FIGS. 1 and 2 illustrate an exemplary substrate 2 in the form of a flow-through substrate coated with washcoat compositions as described herein. Referring to FIG. 1, the exemplary substrate 2 has a cylindrical shape and a cylindrical outer surface 4, an upstream end face 6 and a corresponding downstream end face 8, which is identical to end face 6. Substrate 2 has a plurality of fine, parallel gas flow passages 10 formed therein. As seen in FIG. 2, flow passages 10 are formed by walls 12 and extend through substrate 2 from upstream end face 6 to downstream end face 8, the passages 10 being unobstructed so as to permit the flow of a fluid, e.g., a gas stream, longitudinally through substrate 2 via gas flow passages 10 thereof. As more easily seen in FIG. 2, walls 12 are so dimensioned and configured that gas flow passages 10 have a substantially regular polygonal shape. As shown, the washcoat compositions can be applied in multiple, distinct layers if desired. In the illustrated embodiment, the washcoats consist of a discrete first washcoat layer 14 adhered to the walls 12 of the substrate member and a second discrete washcoat layer 16 coated over the first washcoat layer 14. The present invention can be practiced with one or more (e.g., 2, 3, or 4) washcoat layers and is not limited to the illustrated two-layer embodiment.

For example, in one embodiment, a catalytic article comprises a catalytic material with multiple layers, wherein each layer has a different composition. The order of the layers of the catalytic material can have a significant impact on to the catalytic activity of the catalytic article. For example, in some embodiments, the first layer (e.g., layer 14 of FIG. 2) comprises a PGM-containing catalyst composition as disclosed herein and the second layer (e.g., layer 16 of FIG. 2) comprises a rhodium-containing catalyst composition as disclosed herein.

According to the present disclosure, the order of layers is particularly relevant. Because the inner (first) layer is less exposed to the engine exhaust gas (including phosphorus-containing species) than the outer (second) layer, it is important that the second layer comprises a more phosphorus resistant composition. As such, the outer (second) layer generally comprises the rhodium-containing catalyst composition (including phosphorus resistant materials). The phosphorus trap material in this outer layer protects the catalyst composition from deactivation by the phosphorus-containing species by binding the phosphorus-containing species which would otherwise bind to the catalyst (e.g., resulting in catalyst poisoning). The phosphorous resistant support material in this outer layer provides additional stability toward phosphorus-containing species, e.g., by reducing/preventing rhodium sintering.

Figure 3:
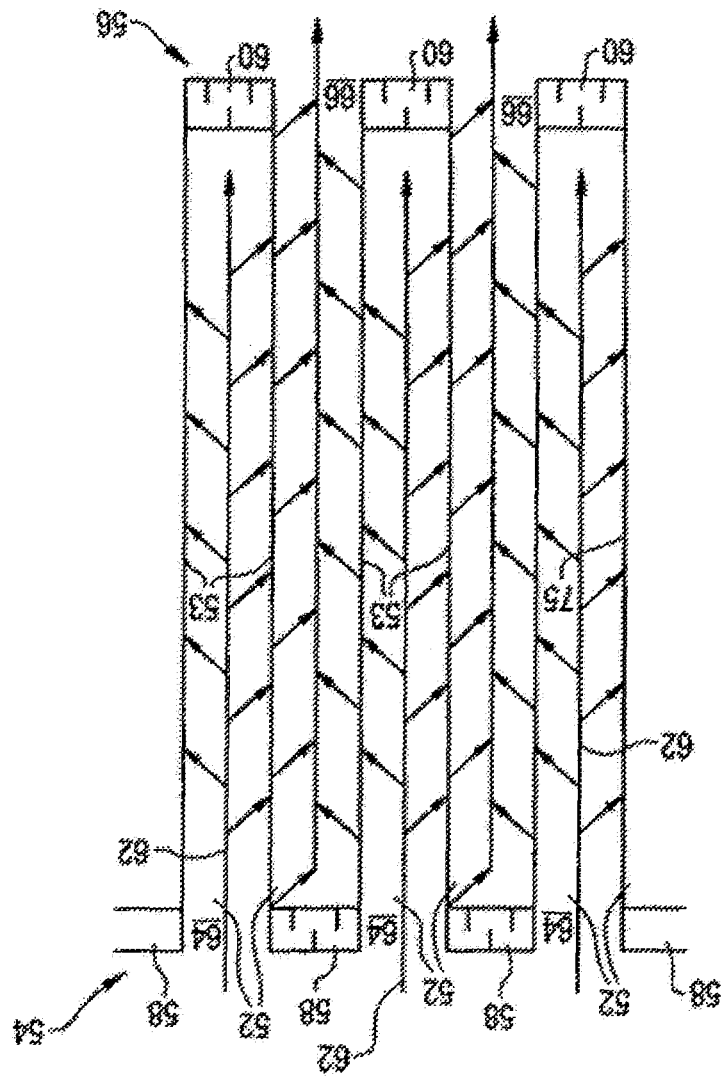
FIG. 3 is a cutaway view of a section enlarged relative to FIG. 1, wherein the honeycomb-type substrate in FIG. 1 represents a wall flow filter substrate monolith.

FIG. 3 illustrates an exemplary substrate 2 in the form a wall flow filter substrate coated with a washcoat composition as described herein. As seen in FIG. 3, the exemplary substrate 2 has a plurality of passages 52. The passages are tubularly enclosed by the internal walls 53 of the filter substrate. The substrate has an inlet end 54 and an outlet end 56. Alternate passages are plugged at the inlet end with inlet plugs 58 and at the outlet end with outlet plugs 60 to form opposing checkerboard patterns at the inlet 54 and outlet 56. A gas stream 62 enters through the unplugged channel inlet 64, is stopped by outlet plug 60 and diffuses through channel walls 53 (which are porous) to the outlet side 66. The gas cannot pass back to the inlet side of walls because of inlet plugs 58. The porous wall flow filter used in this invention is catalyzed in that the wall of said element has thereon or contained therein one or more catalytic materials. Catalytic materials may be present on the inlet side of the element wall alone, the outlet side alone, both the inlet and outlet sides, or the wall itself may consist all, or in part, of the catalytic material. This invention includes the use of one or more layers of catalytic material on the inlet and/or outlet walls of the element.

Figure 4:
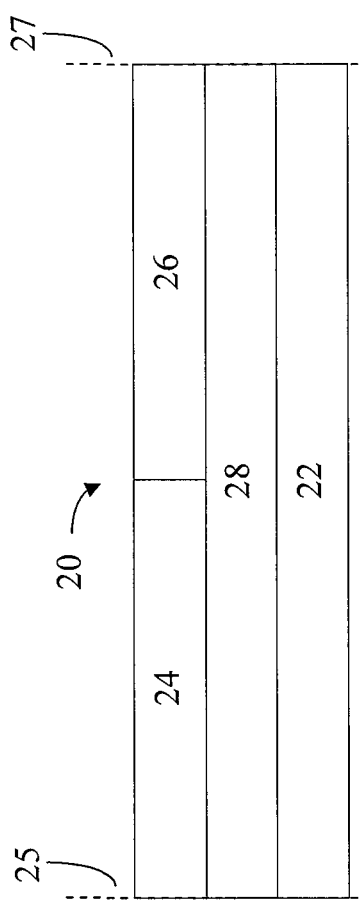
FIG. 4 shows a cross-sectional view of one embodiment of a zoned catalytic article of the present invention.

In some embodiments, the substrate can be coated with at least two layers contained in separate washcoat slurries, wherein at least one layer is in an axially zoned configuration. For example, the same substrate can be coated with a single washcoat slurry of one layer and two different washcoat slurries of another layer, wherein each washcoat slurry is different. This may be more easily understood by reference to FIG. 4, which shows an embodiment in which the first layer comprises a washcoat zone 28 located along the entire length of the substrate 22 and a second layer comprising two washcoat zones 24 and 26 located side by side along the length of the substrate 22 on top of washcoat zone 28. The washcoat zone 24 of specific embodiments extends from the inlet end 25 of the substrate 22 through the range of about 5% to about 95%, about 10 to about 80%, about 15 to about 75%, or about 20 to about 60% of the length of the substrate 22. The washcoat zone 26 extends from the outlet 27 of the substrate 22 from about 5% to about 95%, about 10 to about 80%, about 15 to about 75%, or about 20 to about 60% of the total axial length of the substrate 22.

For example, single catalyst compositions (e.g., the PGM-containing catalyst composition and/or the rhodium-containing catalyst composition) can be separated into their individual components, although the description above focuses on these compositions in their entireties. Different washcoat slurries of these individual components can be prepared and applied onto the same substrate in a zoned configuration. In some embodiments, the components of the rhodium-containing catalyst composition (e.g., phosphorus trap material and the rhodium component impregnated on a phosphorus-resistant support) are zoned in the same layer. For example referring back to FIG. 4, the washcoat zone 24 can represent the phosphorus trap material, extending from the inlet end 25 of the substrate through the range of about 5% to about 95% of the length of the substrate 22. Hence, the washcoat zone 26 comprising the rhodium component is located side by side to zone 24 extending from the outlet 27 of the substrate 22.

In another example, the rhodium-containing catalyst composition comprises two different rhodium components and a phosphorus trap material. Referring back to FIG. 4, the washcoat zone 24 represents a first rhodium component mixed with a phosphorus trap material, extending from the inlet end 25 of the substrate through the range of about 5% to about 95% of the length of the substrate 22. Hence, the washcoat zone 26 comprising the second rhodium component is located side by side to zone 24 extending from the outlet 27 of the substrate 22. See FIG. 5 for specific embodiments of layered and zoned catalytic articles.

In describing the quantity of washcoat or catalytic metal components or other components of the composition, it is convenient to use units of weight of component per unit volume of catalyst substrate. Therefore, the units, grams per cubic inch ("g/in$^3$") and grams per cubic foot ("g/ft$^3$") are used herein to mean the weight of a component per volume of the substrate, including the volume of void spaces of the substrate. Other units of weight per volume such as g/L are also sometimes used. The total loading of the catalytic article (i.e., PGM component impregnated on a first support and rhodium component impregnated on a phosphorus-resistant support material) on the catalyst substrate is typically from about 0.5 to about 6 g/in$^3$, more typically from about 1 to about 5 g/in$^3$, or from about 1 to about 3.5 g/in$^3$. The total loading of the active metal without support material (e.g., PGM component and/or rhodium component) is typically in the range from about 0.1 to about 200 g/ft$^3$, from about 0.1 to about 100 g/ft$^3$, about 1 to about 50 g/ft$^3$, from about 1 to about 30 g/ft$^3$, or from about 5 to about 25 g/ft$^3$ for each layer. It is noted that these weights per unit volume are typically calculated by weighing the catalyst substrate before and after treatment with the corresponding catalyst washcoat composition, and since the treatment process involves drying and calcining the catalyst substrate at high temperature, these weights represent an essentially solvent-free catalyst coating as essentially all of the water of the washcoat slurry has been removed.

Method of Making the Catalyst Compositions

Preparation of the PGM-impregnated support materials (e.g., refractory metal oxide support and/or oxygen storage component) of the PGM-containing catalyst composition and the rhodium-impregnated support materials (e.g., refractory metal oxide support and/or zirconia-based support) of the rhodium-containing catalyst composition typically comprise impregnating the support material in particulate form with an active metal solution, such as a palladium and/or rhodium precursor solution, respectively. The active metal (e.g., palladium and/or rhodium) can be impregnated into the same support particles or separate support particles using an incipient wetness technique. Incipient wetness impregnation techniques, also called capillary impregnation or dry impregnation are commonly used for the synthesis of heterogeneous materials, i.e., catalysts. Typically, a metal precursor is dissolved in an aqueous or organic solution and then the metal-containing solution is added to a catalyst support containing the same pore volume as the volume of the solution that was added. Capillary action draws the solution into the pores of the support. Solution added in excess of the support pore volume causes the solution transport to change from a capillary action process to a diffusion process, which is much slower. The catalyst can then be dried and calcined to remove the volatile components within the solution, depositing the metal on the surface of the catalyst support. The concentration profile of the impregnated material depends on the mass transfer conditions within the pores during impregnation and drying.

The support particles are typically dry enough to absorb substantially all of the solution to form a moist solid. Aqueous solutions of water soluble compounds or complexes of the active metal are typically utilized, such as rhodium chloride, rhodium nitrate (e.g., Ru (NO)$_3$ and salts thereof), rhodium acetate, or combinations thereof where rhodium is the active metal and palladium nitrate, palladium tetra amine, palladium acetate, or combinations thereof where palladium is the active metal.

Following treatment of the support particles with the active metal solution, the particles are dried, such as by heat treating the particles at elevated temperature (e.g., 100-150° C.) for a period of time (e.g., 1-3 hours), and then calcined to convert the active metal to a more catalytically active form. An exemplary calcination process involves heat treatment in air at a temperature of about 400-550° C. for 10 min to 3 hours. The above process can be repeated as needed to reach the desired level of active metal impregnation.

In some embodiments, the PGM impregnated support material is mixed with other components of that composition as disclosed in detail above. In some embodiments, the rhodium-impregnated support material is mixed with a phosphorus trap material (e.g., an alkaline earth metal component supported on a metal oxide or is a composite with a metal oxide).

Substrate Coating Process

The above-noted catalyst compositions are typically prepared in the form of catalyst particles as noted above. These catalyst particles can be mixed with water to form a slurry for purposes of coating a catalyst substrate, such as a honeycomb-type substrate.

In addition to the catalyst particles, the slurry may optionally contain a binder in the form of alumina, silica, zirconium acetate, colloidal zirconia, or zirconium hydroxide, associative thickeners, and/or surfactants (including anionic, cationic, non-ionic or amphoteric surfactants). Other exemplary binders include bohemite, gamma-alumina, or delta/theta alumina, as well as silica sol. When present, the binder is typically used in an amount of about 1-5 wt. % of the total washcoat loading. Addition of acidic or basic species to the slurry can be carried out to adjust the pH accordingly. For example, in some embodiments, the pH of the slurry is adjusted by the addition of ammonium hydroxide, aqueous nitric acid, or acetic acid. A typical pH range for the slurry is about 3 to 12.

The slurry can be milled to reduce the particle size and enhance particle mixing. The milling can be accomplished in a ball mill, continuous mill, or other similar equipment, and the solids content of the slurry may be, e.g., about 20-60 wt. %, more particularly about 20-40 wt. %. In one embodiment, the post-milling slurry is characterized by a D90 particle size of about 10 to about 40 microns, preferably 10 to about 30 microns, more preferably about 10 to about 15 microns. The D90 is determined using a dedicated particle size analyzer. The equipment employed in this example uses laser diffraction to measure particle sizes in small volume slurry. The D90, typically with units of microns, means 90% of the particles by number have a diameter less than that value.

The slurry is coated on the catalyst substrate using any washcoat technique known in the art. In one embodiment, the catalyst substrate is dipped one or more times in the slurry or otherwise coated with the slurry. Thereafter, the coated substrate is dried at an elevated temperature (e.g., 100-150° C.) for a period of time (e.g., 10 min-3 hours) and then calcined by heating, e.g., at 400-600° C., typically for about 10 minutes to about 3 hours. Following drying and calcining, the final washcoat coating layer can be viewed as essentially solvent-free.

After calcining, the catalyst loading obtained by the above described washcoat technique can be determined through calculation of the difference in coated and uncoated weights of the substrate. As will be apparent to those of skill in the art, the catalyst loading can be modified by altering the slurry rheology. In addition, the coating/drying/calcining process to generate a washcoat can be repeated as needed to build the coating to the desired loading level or thickness, meaning more than one washcoat may be applied. The catalyst compositions can be applied in multiple layers with each layer having a different composition as explained above (e.g., layers 14 and 16 of FIG. 2).

Method of Hydrocarbon (HC), Carbon Monoxide (CO), and Nitrogen Oxides (NO$_x$) Conversion In general, hydrocarbons, carbon monoxide, and nitrogen oxides present in the exhaust gas stream of a gasoline or diesel engine can be converted to carbon dioxide, nitrogen, and water according to the equations shown below:

$$2CO+O_2 \rightarrow 2CO_2$$

$$C_xH_y+(x+y/2)O_2 \rightarrow xCO_2+yH_2O$$

$$2NO+2CO \rightarrow N_2+2CO_2$$

$$2NO+2H_2 \rightarrow N_2+2H_2O$$

$$NO+C_xH_y \rightarrow N_2+H_2O+CO_2$$

Typically, hydrocarbons present in an engine exhaust gas stream comprise $C_1$-$C_6$ hydrocarbons (i.e., lower hydrocarbons), although higher hydrocarbons (greater than $C_6$) can also be detected.

Aspects of the current invention are directed towards a method for at least partially converting HC, CO, and NO$_x$ in an exhaust gas stream; comprising contacting the gas stream with a catalytic article as described herein. In some embodiment, the catalytic article converts hydrocarbons to carbon dioxide and water. In some embodiments, the catalytic article converts at least about 60%, or at least about 70%, or at least about 75%, or at least about 80%, or at least about 90%, or at least about 95% of the amount of hydrocarbons present in the exhaust gas stream prior to contact with the catalytic article.

In some embodiment, the catalytic article converts carbon monoxide to carbon dioxide. In some embodiments, the catalytic article converts at least about 60%, or at least about 70%, or at least about 75%, or at least about 80%, or at least about 90%, or at least about 95% of the amount of carbon monoxide present in the exhaust gas stream prior to contact with the catalytic article. In some embodiment, the catalytic article converts nitrogen oxides to nitrogen. In some embodiments, the catalytic article converts at least about 60%, or at least about 70%, or at least about 75%, or at least about 80%, or at least about 90%, or at least about 95% of the amount of nitrogen oxides present in the exhaust gas stream prior to contact with the catalytic article. In some embodiment, the catalytic article converts at least about 50%, or at least about 60%, or at least about 70%, or at least about 80%, or at least about 90%, or at least about 95% of the total amount of hydrocarbons, carbon dioxide, and nitrogen oxides combined present in the exhaust gas stream prior to contact with the catalytic article.

Emission Treatment System

The present invention also provides an emission treatment system that incorporates the catalytic article described herein, such as an emission treatment system generally comprising an engine producing an exhaust gas stream and a catalytic article of the invention positioned downstream from the engine in fluid communication with the exhaust gas stream. The engine can be a gasoline engine and/or compressed natural gas (CNG) engine (e.g., for gasoline and compressed natural gas mobile sources such as gasoline or CNG cars and motorcycles) or can be an engine associated with a stationary source (e.g., electricity generators or pumping stations). In some embodiments, the emission treatment system further comprises one or more additional catalytic components. The relative placement of the various catalytic components present within the emission treatment system can vary. For example, the treatment system can include further components, such as a hydrocarbon trap, ammonia oxidation ($AMO_x$) materials, ammonia-generating catalysts, a selective catalytic reduction (SCR) catalyst, and $NO_x$ storage and/or trapping components (LNTs). The preceding list of components is merely illustrative and should not be taken as limiting the scope of the invention.

EXAMPLES

Aspects of the present invention are more fully illustrated by the following examples, which are set forth to illustrate certain aspects of the present invention and are not to be construed as limiting thereof.

Example 1

Screening for Powder Catalysts

A high-throughput experimentation system was used for the screening of powder catalysts for resistance towards phosphorus (P). TWC powder catalysts were prepared by impregnating Pd nitrate or Rh nitrate onto different supports and calcining at 550° C. for 2 h. The following TWC powder catalysts were prepared: $Pd/CeO_2$—$ZrO_2$, $Pd/La_2O_3$—$Al_2O_3$, $Pd/La_2O_3$—$Al_2O_3$+BaO (physically mixed), Pd/BaO—$Al_2O_3$, $Rh/Al_2O_3$, $Rh/La_2O_3$—$Al_2O_3$, $Rh/ZrO_2$—$La_2O_3$—$Al_2O_3$, and $Rh/La_2O_3$—$ZrO_2$. $(NH_4)_2HPO_4$ (s) was used as a P source and was well mixed with the above mentioned Pd and Rh-containing powder catalysts (5 wt. % P target), calcined at 550° C. for 5 h, and then aged at 950/1050° C. under lean-rich condition with 10% steam. The testing included TWC light-off performance, λ-sweep and OSC function measurement.

Figure 6:
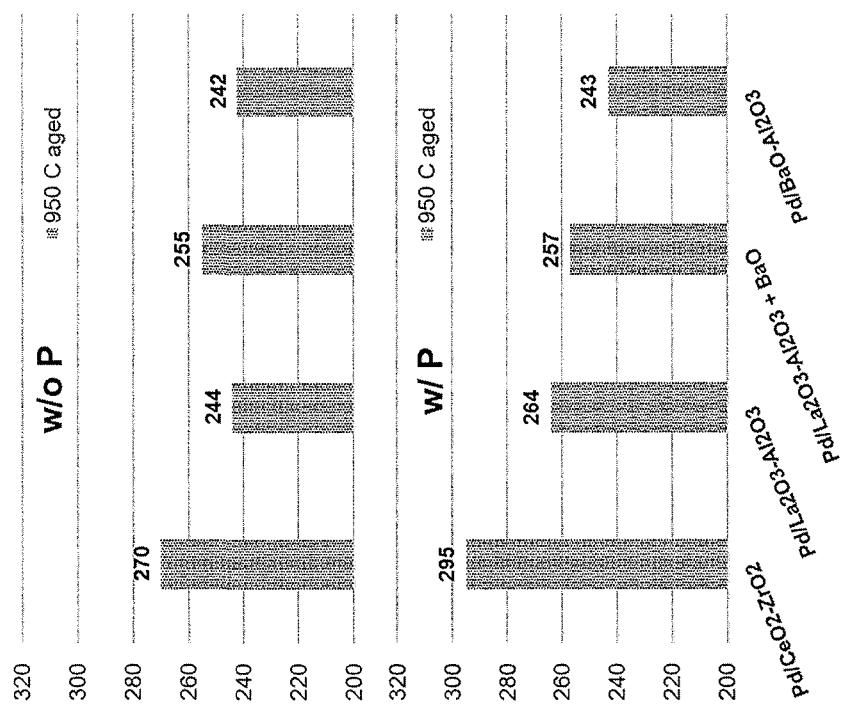
FIG. 6 is a bar graph showing $T_{50}$ for HC light-off of powder sample Pd-containing catalysts aged with and without phosphorus (P) at 950° C. and 1050° C. respectively.

As shown from the HC light off results shown in FIG. 6, $Pd/CeO_2$—$ZrO_2$ was most susceptible to P poisoning especially after 950° C. aging. These results suggest that a Pd/OSC should be placed in the first layer (i.e., layer directly disposed onto the substrate) when designing a layered TWC structure. $Pd/Al_2O_3$ was also sensitive to P poisoning after 950° C. aging. However, when combined with BaO (Pd/$La_2O_3$—$Al_2O_3$+BaO, Pd/BaO—$Al_2O_3$), no significant P poisoning effect was observed after 950° C. aging. From λ-sweep results (data not shown), no pronounced differentiation of HC conversion was observed for the different carriers. Considering the light off performance, P resistance and material price, the $Pd/La_2O_3$—$Al_2O_3$+BaO (physically mixed) combination represents a preferred PGM-containing catalyst composition for a first layer in a washcoated catalyst design of the invention.

Figure 7:
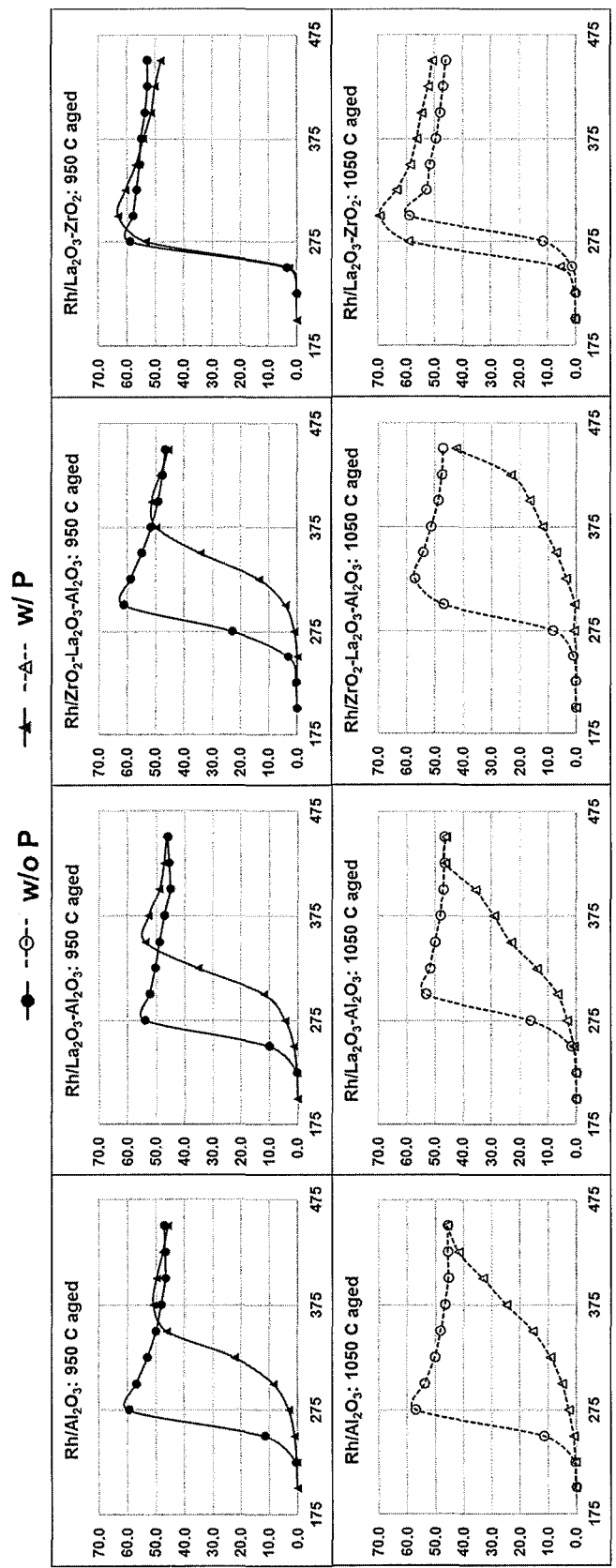
FIG. 7 is a series of graphs showing the $NO_x$ light-off curves on powder sample Rh-containing catalysts aged with and without phosphorus (P) at 950° C. and 1050° C. respectively.

Analogously, numerous Rh catalysts supported on different alumina based materials and zirconia-based materials were aged with and without P at 950 or 1050° C. and tested for NO light-off performance. Generally, all of the rhodium components supported on alumina based materials deteriorated significantly based on their $NO_x$ light-off catalytic activity after P aging at 950/1050° C. (same for CO light-off) (see FIG. 7). In contrast, no P poisoning effect was observed for $Rh/La_2O_3$—$ZrO_2$ catalyst compositions after 950° C. aging, and even a promotion effect of P on $NO_x$ light-off was observed on this catalyst after 1050° C. aging (same for CO light-off) These results combined with λ-sweep results (data not shown) clearly indicate that $La_2O_3$—$ZrO_2$ is a good candidate for a support for the rhodium component having a balanced $NO_x$ light-off activity and conversion after P aging. This $Rh/La_2O_3$—$ZrO_2$ component may be incorporated into a rhodium-containing catalyst composition (i.e., second layer disposed on top of the first layer) of a washcoated TWC catalyst having a layered structure.

Example 2

Characterization of Powder Catalysts Aged with and without Phosphorus (P)

To better understand the P effect on different Pd and Rh catalysts, several selected catalysts were aged with and without P. $Pd/La_2O_3$—$Al_2O_3$, $Pd/CeO_2$—$ZrO_2$ and $Rh/La_2O_3$—$ZrO_2$ were chosen and characterized using CO chemisorption and $H_2$-TPR methods. For CO chemisorption, the samples were pretreated in He from room temperature to 150° C., and then reduced in 4% $H_2/N_2$ from 150 to 400° C. Afterwards, the samples were cooled to room temperature and pulsed with 10% CO/He to see the CO chemisorption amount. For $H_2$-TPR, the samples were pretreated in 4% $O_2$/He at 500° C. for 30 min and then cooled to 50° C. Afterwards, the samples were reduced in 1% $H_2/N_2$ with programmed temperature increase up to 900° C. to see the $H_2$ consumption profiles. As shown in Table 1, the P aging of $Pd/La_2O_3$—$Al_2O_3$ decreased Pd dispersion mildly by 30%, which was possibly one of the reasons for its gentle response to P poisoning. However, the P deposited on $Pd/CeO_2$—$ZrO_2$ decreased the Pd dispersion severely by 90%, which was consistent with its strong response to P poisoning. The Rh dispersion on $La_2O_3$—$ZrO_2$ after P aging decreased by 75% compared to reference. However, the $NO_x$ conversion was not affected by P deposition at all, which was possibly due to the facile reduction of Rh—O—P species formed in situ.

TABLE 1

Pd/Rh dispersion by CO chemisorption (950° C. aging, lean-rich condition, 10% stm, 5 h)

| Sample | Pd (%) | Rh (%) |
|---|---|---|
| 3% $Pd/La_2O_3$—$Al_2O_3$ | 4.35 | — |
| 3% $Pd/La_2O_3$—$Al_2O_3$ + 5% P | 2.86 | — |
| 1.5% $Pd/CeO_2$—$ZrO_2$ | 7.57 | — |
| 1.5% $Pd/CeO_2$—$ZrO_2$ + 5% P | 0.88 | — |
| 1% $Rh/La_2O_3$—$ZrO_2$ | — | 12.34 |
| 1% $Rh/La_2O_3$—$ZrO_2$ + 5% P | — | 3.13 |

Figure 8:
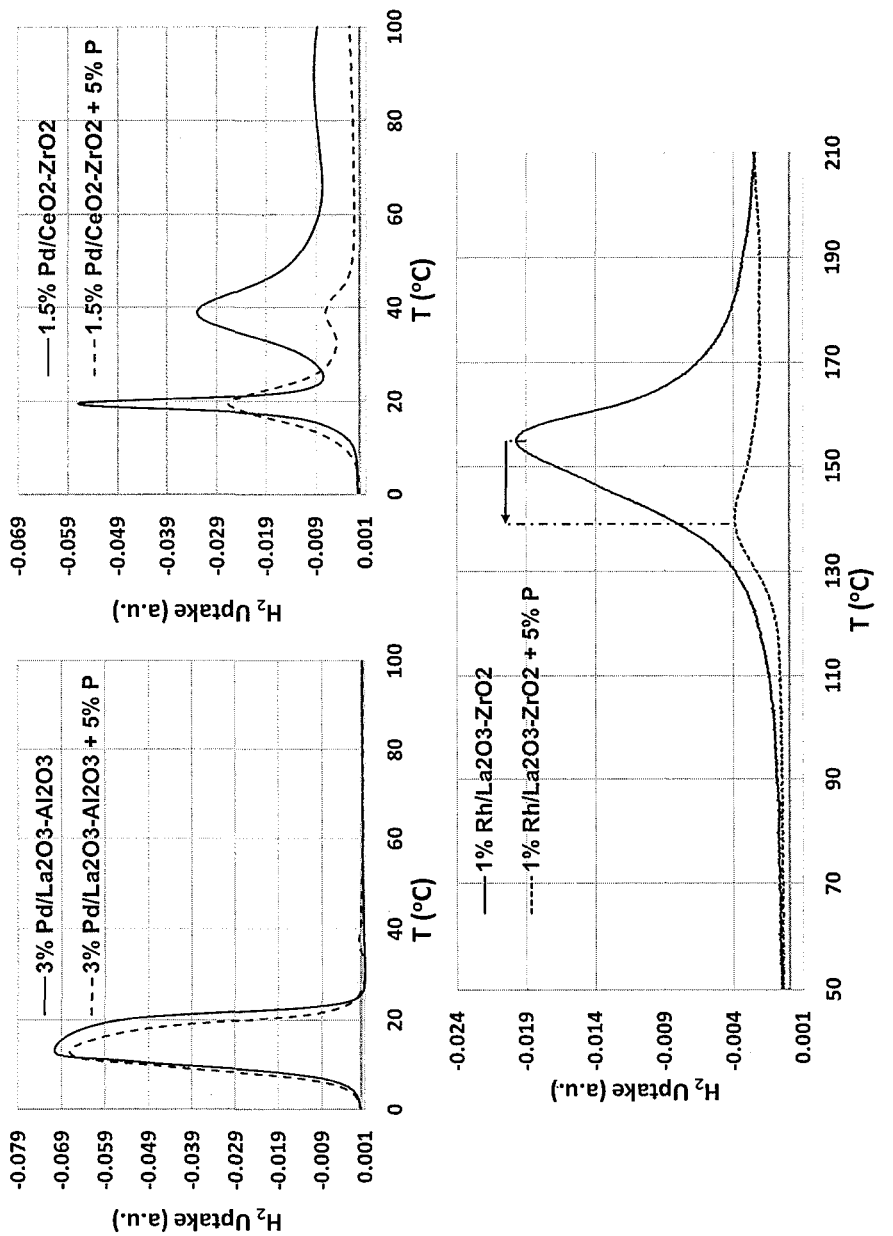
FIG. 8 is a line graph showing hydrogen temperature-programmed reduction ($H_2$-TPR) profiles of Pd and Rh catalysts (aged at 950° C. under lean-rich condition in the presence of 10% steam for 5 h)

FIG. 8 shows the $H_2$-TPR profiles of Pd and Rh powder catalysts aged at 950° C. with and without P. The P aged $Pd/La_2O_3$—$Al_2O_3$ did not show a $H_2$ consumption decrease or reduction in temperature change. Yet, with the $CeO_2$—$ZrO_2$ material, the reducibility of Pd species ($H_2$ consumption) was decreased after P aging. For Rh/La$_2$O$_3$—ZrO$_2$ aged with P, the reducibility of Rh species seemed to be enhanced with the maximum reduction peak shifting from 156 to 142° C. This observation confirmed the previous assumption that the in situ formed Rh—O—P species might be easier to reduce.

Example 3

Washcoated Catalyst Design

Figure 9:
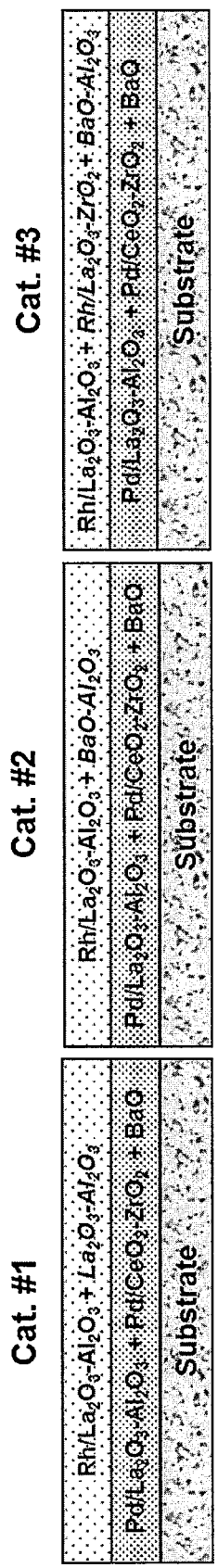
FIG. 9 shows a series of different catalyst designs (i.e., catalyst 1 (Cat. #1), catalyst 2 (Cat. #2), and catalyst 3 (Cat. #3)) in a layered configuration.

Based on the powder catalyst testing results, three washcoated catalytic articles were designed with a layered structure. For example, all three catalytic article designs included the same PGM-containing catalyst composition (Pd/CeO$_2$—ZrO$_2$, Pd/La$_2$O$_3$—Al$_2$O$_3$), and BaO in the first layer, and a different rhodium-containing catalyst composition in the second layer (see FIG. 9). For example, the entire rhodium component in the rhodium-containing catalyst composition in Catalytic Article 1 (Cat. #1) was supported on La$_2$O$_3$—Al$_2$O$_3$ and the rhodium-containing component of Cat. #1 also contained La$_2$O$_3$—Al$_2$O$_3$ as a diluent. In Catalytic Article 2 (Cat. #2) the entire rhodium component was supported on La$_2$O$_3$—Al$_2$O$_3$, and the rhodium-containing catalyst composition further comprised BaO—Al$_2$O$_3$ as a phosphorus trap material. In Catalytic Article 3 (Cat. #3), a portion of the rhodium component (33 wt. %) was supported on La$_2$O$_3$—Al$_2$O$_3$, and the remaining portion of rhodium component (67 wt. %) was supported on a phosphorus resistant support material (La$_2$O$_3$—ZrO$_2$). The rhodium-containing catalyst composition of Cat. #3 further comprised a phosphorus trap material (BaO—Al$_2$O$_3$). The benefits of phosphorus trap material BaO—Al$_2$O$_3$ was expected to be seen when comparing Catalytic Article 2 with Catalytic Article 1, and the benefits of La$_2$O$_3$—ZrO$_2$ phosphorus resistant support material as a support for the rhodium component was expected to be seen when comparing Catalytic Article 3 with Catalytic Article 2.

Example 4

Testing of Washcoated Core Catalysts on Gasoline Vehicle Simulator (GVS)

TWC Catalytic Articles 1, 2, and 3 (prepared according to U.S. Pat. No. 6,764,665 to Deeba et al., which is incorporated herein by reference in its entirety) were cored to 1.0"×1.5" size, and then aged at 950° C. under lean-rich condition with 10% steam for 5 h (Cat. #1-T, #2-T, and #3-T). The cores were tested on GVS reactor using FTP-72 cycles. Afterwards, the cores were dipped into (NH$_4$)$_2$HPO$_4$ solution with a certain concentration for a period of time to obtain the 1 wt. % P target, and were then calcined at 700° C. for 1 h (Cat. #1-T+P, #2-T+P, #3-T+P). All catalytic articles were tested on a GVS reactor again using FTP-72 cycles. It should be noted that this P aging method was relatively "severe", which could result in the deposition of P species throughout the washcoat layers even to the cordierite substrate leading to obvious deactivation of TWC performance.

Figure 10:
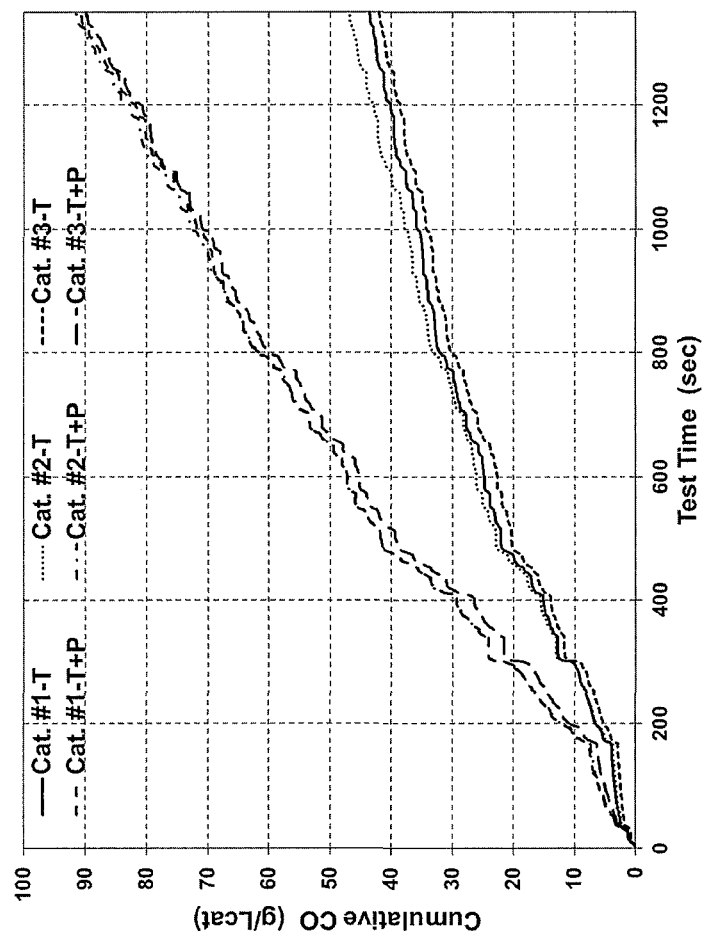
FIG. 10 is a line graph showing FTP-72 test results on a GVS reactor for the cumulative CO emission of cores (1.0"×1.5", 600/4) with catalyst 1 (Cat. #1-T), catalyst 2 (Cat. #2-T), and catalyst 3 (Cat. #3-T) aged in the absence of phosphorus and cores with catalyst 1 (Cat. #1-T+P), catalyst 2 (Cat. #2-T+P), and catalyst 3 (Cat. #3-T+P) aged in the presence of phosphorus.
Figure 11:
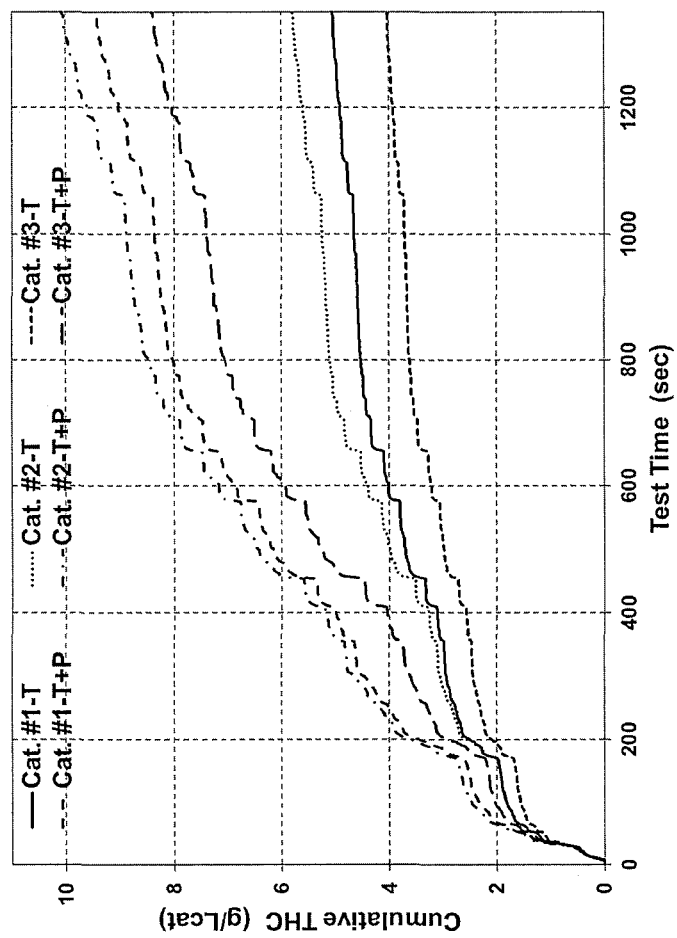
FIG. 11 is a line graph showing FTP-72 test results on a GVS reactor for cumulative HC emission of various catalytic articles aged in the presence and absence of phosphorus.
Figure 12:
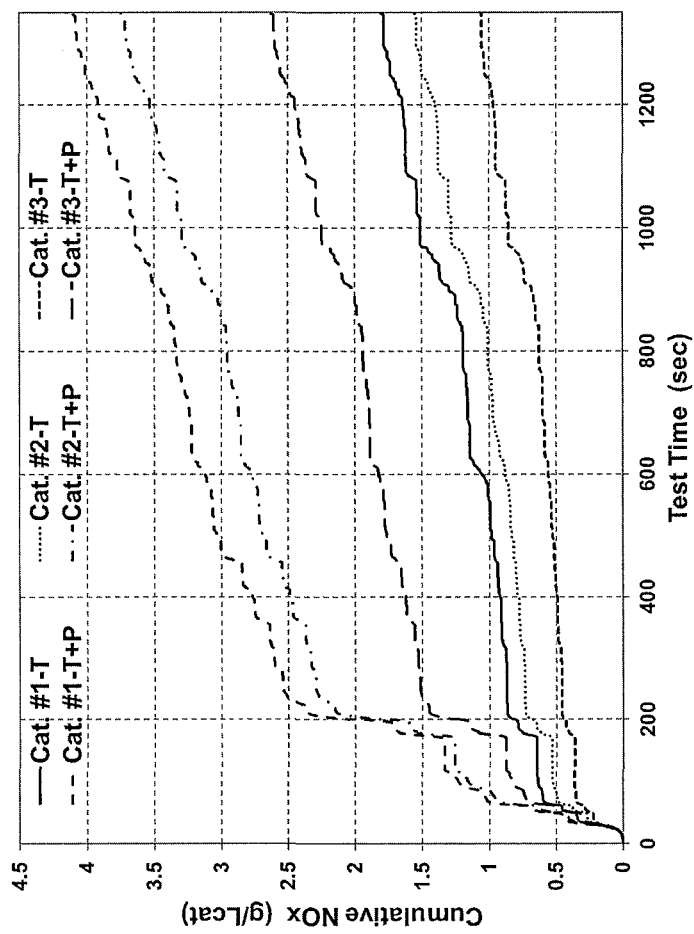
FIG. 12 is a line graph showing FTP-72 test results on a GVS reactor for cumulative $NO_x$ emission of various catalytic articles aged in the presence and absence of phosphorus.

As the GVS results show in FIGS. 10, 11, and 12, after thermal aging, the cumulative CO emission of catalysts Cat. #1-T, #2-T, and #3-T were similar to each other, and after thermal aging with P, the deterioration of CO performance was nearly the same for all three catalytic articles Cat. #1-T+P, #2-T+P, and #3-T+P. These results indicate that the incorporation of a phosphorus trap material and a phosphorus resistant support material for the rhodium component did not influence the CO performance before and after P aging. For cumulative HC, Cat. #2-T with a phosphorus trap material showed a decrease in HC performance compared to the Cat. #1-T reference, but the incorporation of Rh/La$_2$O$_3$—ZrO$_2$ in Cat. #3-T further improved the HC performance compared to Cat. 42-T. After P aging, the HC performance is as follows: Cat. #1-T+P<Cat. #2-T+P<Cat. #3-T+P, and both of the benefits from phosphorus trap material and the phosphorus resistant support for the rhodium component can be confirmed from these HC results. For cumulative NO$_x$, after thermal aging, the NO$_x$ performance is as follows: Cat. #1-T<Cat. #2-T<Cat. #3-T, and after P aging, the NO$_x$ performance sequence is exactly the same: Cat. #1-T+P<Cat. #2-T+P<Cat. #3-T+P. Great benefit from the phosphorus trap material and the phosphorus resistant support for the rhodium component was obtained for HC and NO$_x$ performance before and after P aging. As such, this concept was transferred to full part catalyst design for practical application.

Example 5

Testing of Washcoated Full Part Catalytic Articles on an Engine

The as-prepared full part Catalytic Articles, Cat. #1-3 (4.16"×3.0", 400/4), were thermally aged on engine first at 950° C. for 50 h (Cat. #1-3-T), and then tested on another engine for FTP-75 cycles. Afterwards, all the catalytic articles were P aged using P containing fuel on engine at 700° C. for 75 h (Cat. #1-3-T+P), and then tested on the engine again for FTP-75 cycles to see the deterioration in TWC performance.

Figure 13:
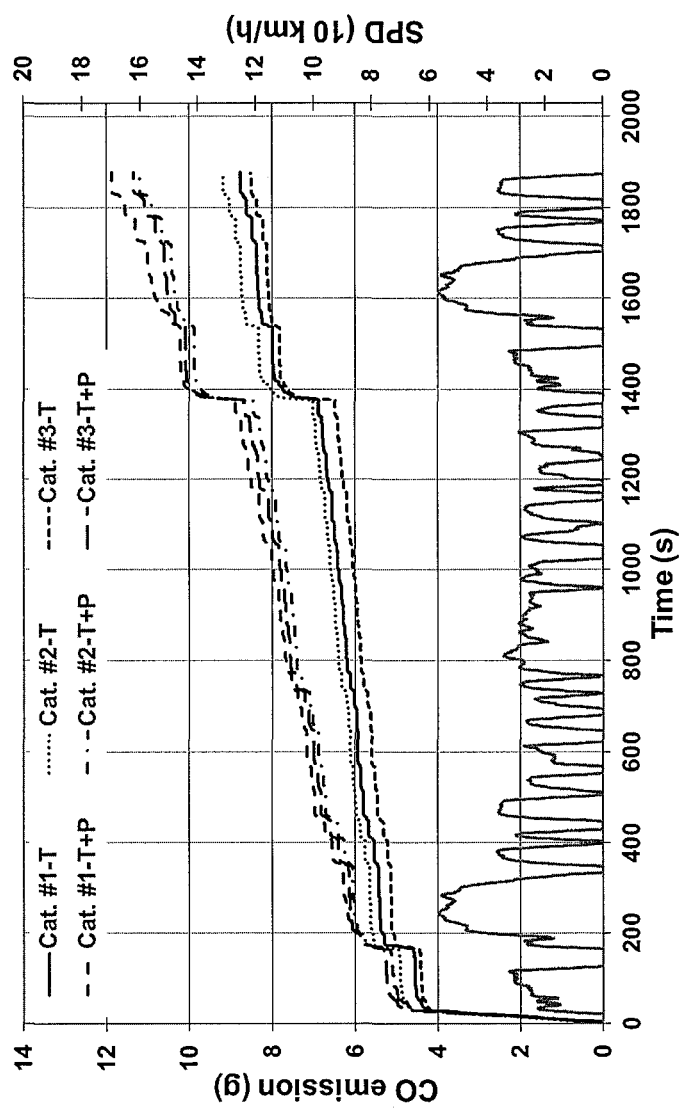
FIG. 13 is a line graph showing FTP-75 test results on an engine for CO emission of various catalytic articles aged in the presence and absence of phosphorus (single close-coupled 1 (CC1) catalyst testing)
Figure 14:
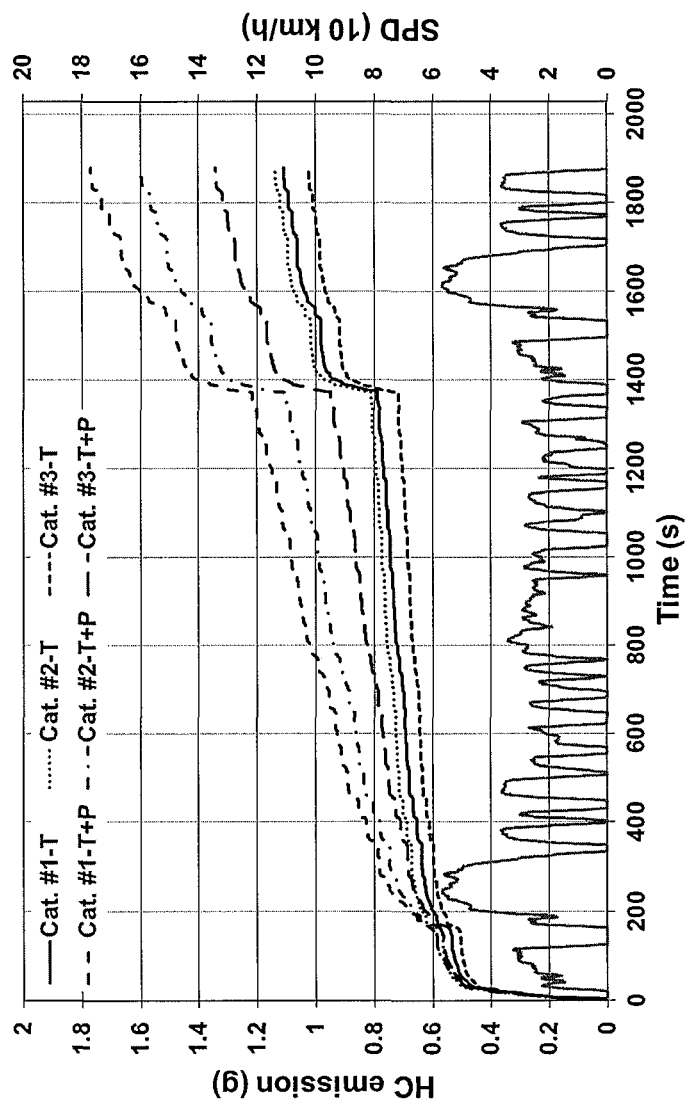
FIG. 14 is a line graph showing FTP-75 test results on an engine for HC emission of various catalytic articles aged in the presence and absence of phosphorus (single close-coupled 1 (CC1) catalyst testing)
Figure 15:
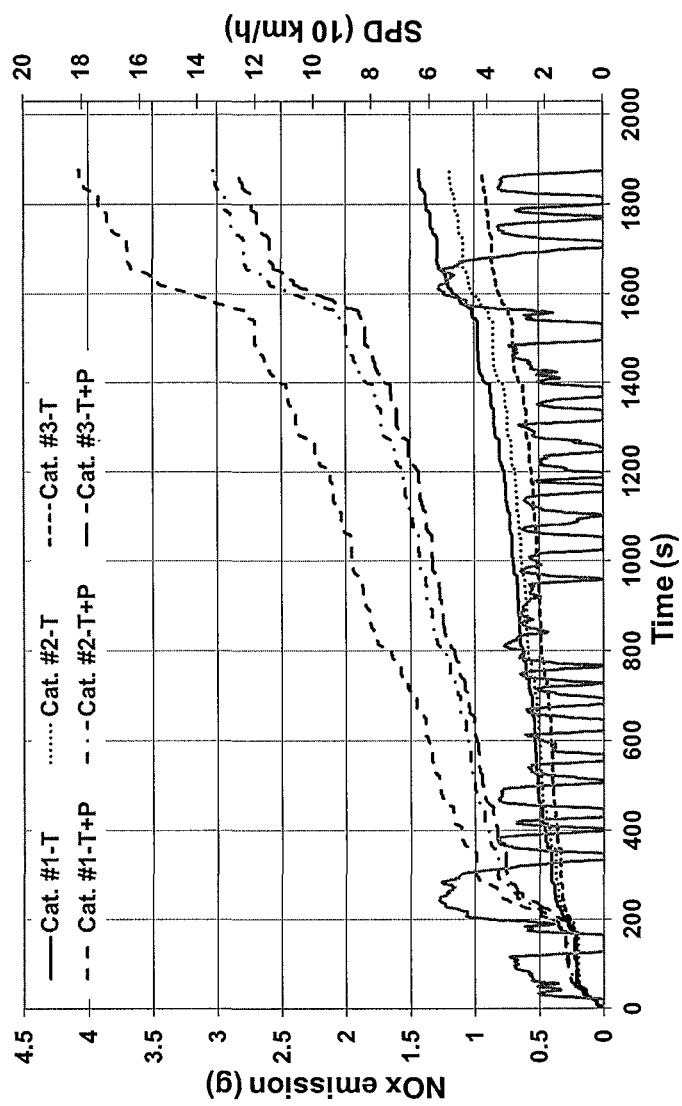
FIG. 15 is a line graph showing FTP-75 test results on an engine for $NO_x$ emission of various full part catalysts aged in the presence and absence of phosphorus (single close-coupled 1 (CC1) catalyst testing)

As the engine test results show in FIGS. 13-15, after thermal aging, CO emission on Cat. #2-T was slightly higher than that on Cat. #1-T, while after P aging, Cat. #2-T showed slightly lower emission than Cat. #1-T, proving the positive effect of BaO—Al$_2$O$_3$ as a phosphorus trap material. Cat. #3 with Rh/La$_2$O$_3$—ZrO$_2$ and BaO—Al$_2$O$_3$ in combination showed the best CO performance after thermal aging and showed similar performance as that of Cat. #2 after P aging. As for cumulative HC emission, Cat. 42-T also showed slightly higher HC emission than Cat. #1-T. However, after P aging, much less deterioration was found on Cat. #2-T+P than Cat. #1-T+P (40% vs 60%). In summary, these engine testing results indicate that BaO—Al$_2$O$_3$ as a phosphorus trap material in the rhodium-containing catalyst composition (i.e., second layer) may show a slightly negative effect on HC and CO emission after thermal aging, but shows a more positive effect after P aging. For Cat. #3, not only after thermal aging but also after P aging, is its HC performance the highest among all the three samples while the deterioration factor was the lowest (31%). For the cumulative NO$_x$ emission, after thermal aging, the NO$_x$ performance on the samples showed the following sequence: Cat. #1-T <Cat. 42-T <Cat. #3-T, indicating that BaO—Al$_2$O$_3$ as a phosphorus trap material in the second layer helped the NO$_x$ reduction and the use of Rh/La$_2$O$_3$—ZrO$_2$ further improved the NO$_x$ performance. After P aging, all the samples showed deterioration to a certain extent regarding to NO$_x$ emission, and the samples with BaO—Al$_2$O$_3$ (Cat. #2-T+P and Cat. #3-T+P) showed much lower NO$_x$ emission than reference sample without phosphorus trap material (Cat. #1-T+P). Cat. #3-T+P showed the best NO$_x$ performance again in this case. The above-mentioned results confirmed that the benefit from BaO—Al$_2$O$_3$ as a phosphorus trap material and La$_2$O$_3$—

$ZrO_2$ as a phosphorus resistant support material for the rhodium component could be well transferred to a full part TWC catalytic article for engine testing using a single CC1 catalyst configuration.

Example 6

Testing of Washcoated Full Part Catalytic Articles on Vehicle

The as-prepared full part Catalytic Articles Cat. #1-3 (4.16"×3.0", 400/4) were thermally aged on an engine first at 950° C. for 50 h (Cat. #1-3-T), and then tested as close-coupled 1 (CC1) catalysts on a real vehicle (Honda Civic) for FTP-75 cycles. The close-coupled 2 (CC2) catalyst was kept the same for all testing, which was a PGM-containing catalyst composition in the first layer, wherein the PGM was palladium, and a rhodium-containing catalyst composition in the second layer. Afterwards, all the CC1 catalysts were P aged using P-containing fuel on an engine at 700° C. for 75 h (Cat. #1-3-T+P), and then tested as CC1 catalysts (with the same CC2 catalyst) on the vehicle again for FTP-75 cycles to see the deterioration in TWC performance.

Figure 16:
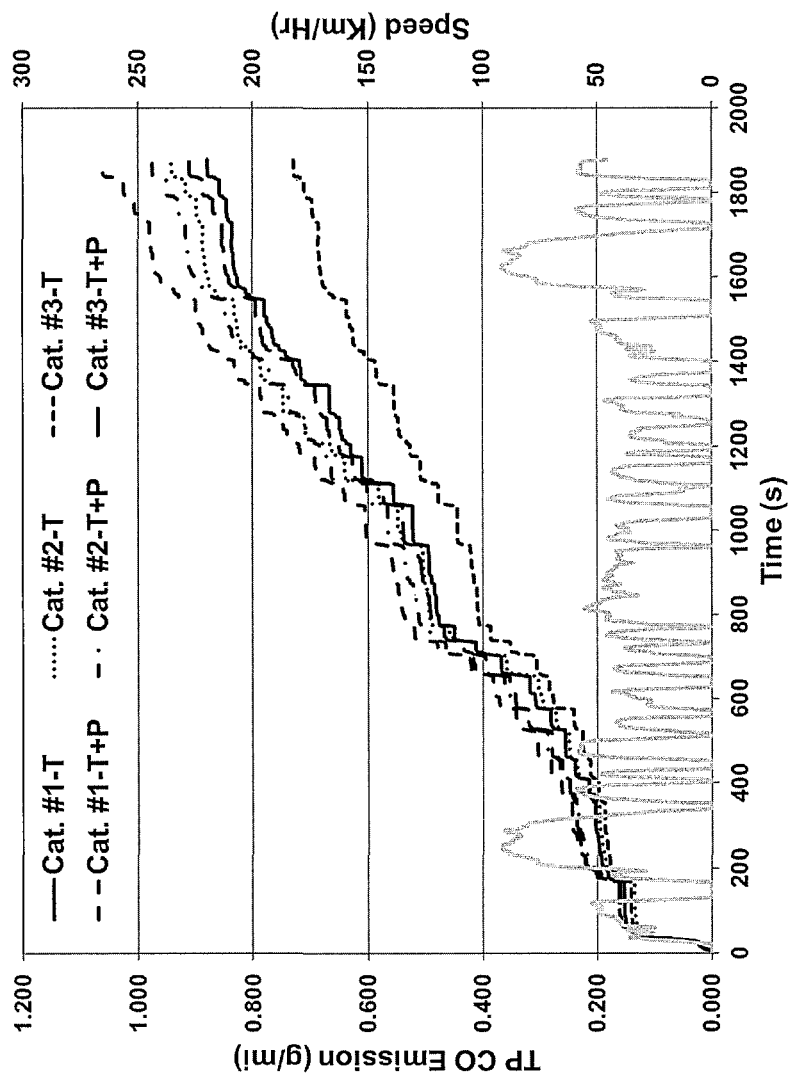
FIG. 16 is a line graph showing FTP-75 test results on a vehicle for CO emission of various full part catalysts aged in the presence and absence of phosphorus (CC1+CC2 catalyst system testing)
Figure 17:
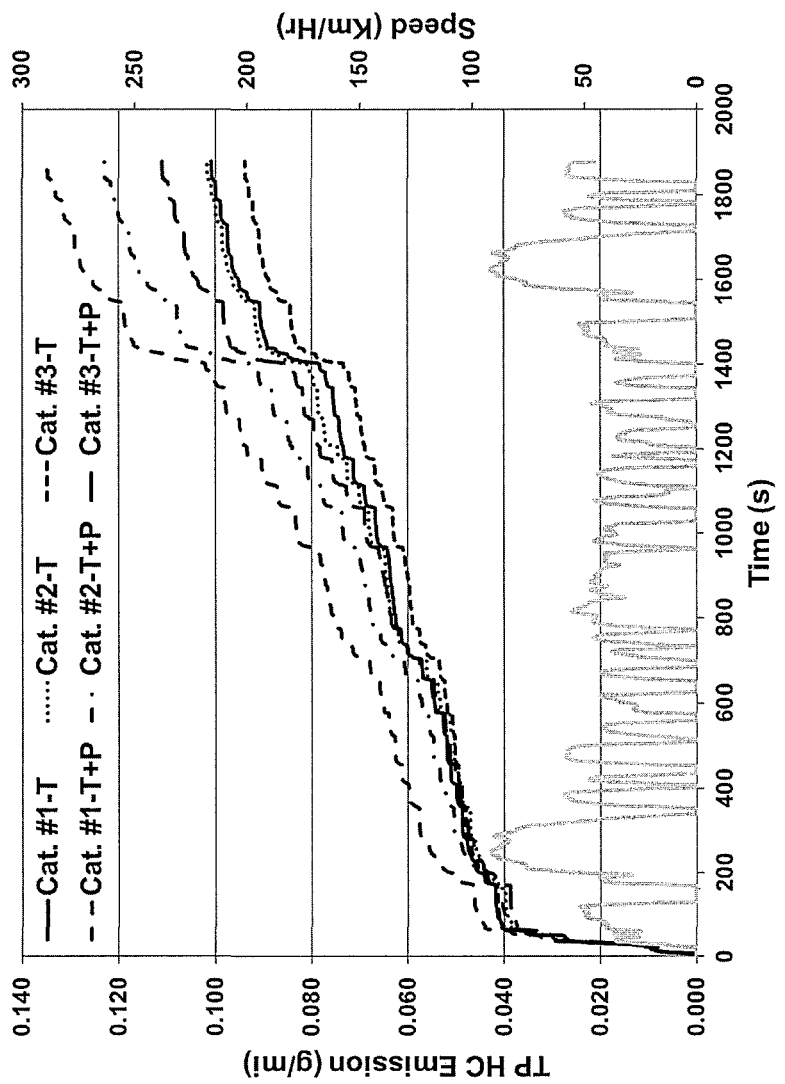
FIG. 17 is a line graph showing FTP-75 test results on a vehicle for HC emission for various full part catalysts aged in the presence and absence of phosphorus (CC1+CC2 catalyst system testing)
Figure 18:
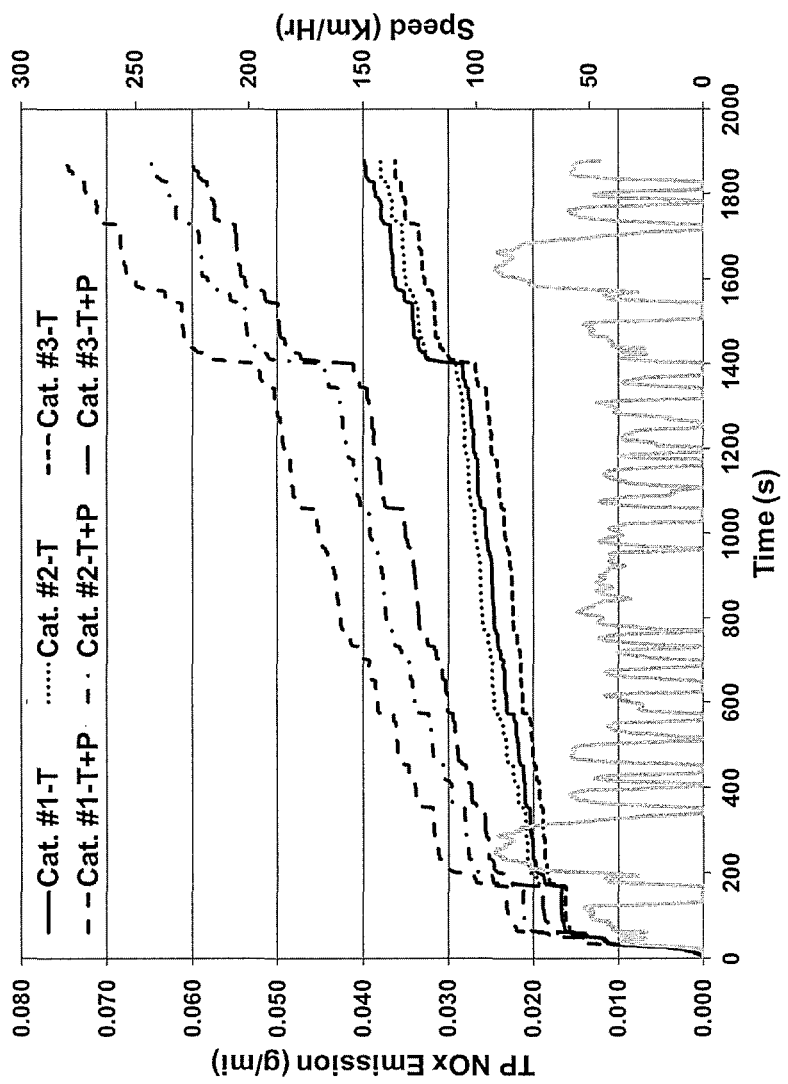
FIG. 18 is a line graph showing FTP-75 test results on a vehicle for $NO_x$ emission for various full part catalysts aged in the presence and absence of phosphorus (CC1+CC2 catalyst system testing).

As the vehicle testing results shown in FIGS. 16-18, consistent with the CO emission results obtained on engine, Cat. #2-T with $BaO$—$Al_2O_3$ as a phosphorus trap material showed slightly increased tailpipe (TP) CO emission comparing to Cat. #1-T reference, while Cat. #3-T still showed the best CO performance owing to the large benefit from $Rh/La_2O_3$—$ZrO_2$. After P aging, the TP CO performance is as follows: Cat. #1-T+P<Cat. #2-T+P<Cat. #3-T+P. For TP HC emission, Cat. #1-T and Cat. #2-T showed pretty similar performance, and Cat. #3-T was the best. After P aging, the TP HC performance showed exactly the same sequence as that of TP CO. For TP $NO_x$ emission, after P aging, the difference of $NO_x$ emission was small, but still the following sequence was observed: Cat. #1-T<Cat. #2-T<Cat. #3-T. After P aging, the difference of $NO_x$ emission was more obvious, and the benefit from $BaO$—$Al_2O_3$ as a phosphorus trap material and $La_2O_3$—$ZrO_2$ as a phosphorus resistant support material for the rhodium component was more evident: Cat. #1-T+P<Cat. #2-T+P<Cat. #3-T+P. These vehicle testing results clearly showed that the use of a phosphorus trap material in the rhodium-containing catalyst composition (i.e. second layer) plus the phosphorus resistant support material for the rhodium component is feasible in a CC1+CC2 TWC catalyst system for gasoline emission control.

These results demonstrate the use of an alkaline earth metal oxide (e.g., BaO) containing phosphorus trap material and a phosphorus resistant material as a support material for the rhodium component in the same catalyst composition (i.e., second layer) to provide TWC catalytic articles with improved resistance towards phosphorus poisoning. Contrary to common understanding that BaO has a negative effect on the catalytic performance of rhodium present in the same layer after thermal aging, this data shows that the simultaneous application of $BaO$—$Al_2O_3$ phosphorus trap material and $Rh/La_2O_3$—$ZrO_2$ within the same layer can result in enhanced TWC catalytic performance after thermal aging and thermal+P aging.

What is claimed:

1. A TWC catalytic article, comprising:
   a catalytic material on a substrate, the catalytic material comprising a first layer disposed on the substrate and a second layer disposed on the first layer,
   wherein the second layer comprises:
     a phosphorous trap material comprising an alkaline earth metal component and a metal oxide, wherein the alkaline earth metal component is supported on the metal oxide or the alkaline earth metal component is in the form of a composite with the metal oxide, and
     a rhodium component impregnated on a phosphorus-resistant support material, wherein the phosphorus-resistant support material is a zirconia-based support material and comprises from 50 wt % to 99 wt % zirconia;
   and
   wherein the catalytic material is effective for three-way conversion to oxidize carbon monoxide and hydrocarbons and reduce nitrogen oxides.

2. The TWC catalytic article of claim 1, wherein the phosphorus-resistant support material is chosen from zirconia, lanthana-zirconia, titania-zirconia, titania-lanthana-zirconia, baria-zirconia, strontia-zirconia, neodymia-zirconia, praseodymia-zirconia, tungsten oxide-zirconia, niobia-zirconia, and yttria-zircoma.

3. The TWC catalytic article of claim 2, wherein the phosphorus-resistant support material is lanthana-zirconia, and the lanthana-zirconia comprises zirconia in an amount from 80 wt % to 99 wt %.

4. The TWC catalytic article of claim 1, wherein the second layer comprises the rhodium component in an amount from 0.05 wt % to 5 wt %.

5. The TWC catalytic article of claim 1, wherein the alkaline earth metal component is chosen from barium oxide, magnesium oxide, calcium oxide, and strontium oxide.

6. The TWO catalytic article of claim 5, wherein the alkaline earth metal component is barium oxide, and wherein the second layer comprises the barium oxide in an amount of from 1 wt % to 40 wt %.

7. The TWO catalytic article of claim 1, wherein the metal oxide is chosen from alumina, zirconia, titania, and cerin.

8. The TWC catalytic article of claim 1, wherein the phosphorus trap material is a composite of barium oxide and alumina.

9. The TWO catalytic article of claim 1, further comprising:
   a second rhodium component, wherein the second rhodium component is impregnated on at least one refractory metal oxide support chosen from alumina, lanthana-alumina, ceria-alumina, zirconia-alumina, ceria-zirconia-alumina, lanthana-zirconia-alumina, and lanthana-neodymia alumina.

10. The TWO catalytic article of claim 1, further comprising:
    a second rhodium component impregnated on at least one refractory metal oxide support chosen from ceria-zirconia, lanthana-cerin-zirconia, neodymia-ceria-zirconia, praseodymia-ceria-zirconia, yttria-ceria-zirconia, niobia-ceria-zirconia, and strontia-ceria-zirconia.

11. The TWC catalytic article of claim 1,
    wherein the first layer comprises a platinum group metal component impregnated on a first support material, and
    wherein at least a portion of the first support material is at least one oxygen storage component chosen from ceria, zirconia, lanthana, yttria, neodymia, praseodymia, and niobia or wherein at least a portion of the first support material is at least one refractory metal oxide support chosen from alumina, lanthana-alumina, cerin-alumina, zirconia-alumina, ceria-zirconia-alumina, lanthana-zirconia-alumina, and lanthana-neodymia-alumina.

12. The TWC catalytic article of claim 11, wherein the first layer further comprises at least one chosen from barium oxide, magnesium oxide, calcium oxide, strontium oxide, lanthanum oxide, cerium oxide, zirconium oxide, manganese oxide, copper oxide, iron oxide, praseodymium oxide, yttrium oxide, and neodymium oxide.

13. The TWC catalytic article of claim 1, wherein the second layer is a physical mixture of the phosphorus trap material and the rhodium component impregnated on the phosphorus-resistant support material.

14. The TWC catalytic article of claim 1, wherein the alkaline earth metal component is present in an amount of 1 wt % to 20 wt % of the second layer.

15. The TWC catalytic article of claim 1, wherein the phosphorus-resistant support material is lanthana-zirconia, and the alkaline earth metal component is barium oxide, the barium oxide being supported on alumina or the barium oxide being in the form of a barium oxide-alumina composite.

16. The TWC catalytic article of claim 1, wherein the first layer comprises: palladium impregnated on ceria-zirconia and lanthana-alumina, and barium oxide.

17. The TWC catalytic article of claim 1, wherein the second layer is zoned into an upstream zone and a downstream zone, and the upstream zone comprises the phosphorus trap material.

18. The TWO catalytic article of claim 1, wherein the substrate is a metal or ceramic monolithic honeycomb substrate.

19. A method for reducing CO, HC, and NOx levels in a gas stream, the method comprising:
contacting the gas stream with the TWO catalytic article of claim 1 for a time and at a temperature sufficient to reduce the levels of CO, HC, and NOx in the gas stream,
wherein the CO, HO, and NOx levels in the gas stream are reduced by at least 50 compared to the CO, HC, and NOx levels in the gas stream prior to the contacting with the TWO catalytic article.

20. An emission treatment system, comprising: an engine producing an exhaust gas stream; and
the TWC catalytic article of claim 1 positioned downstream from the engine in fluid communication with the exhaust gas stream and adapted for an abatement of CO and HC and conversion of NOx to $N_2$.

21. The emission treatment system of claim 20,
wherein the engine is a gasoline engine, a compressed natural gas (CNG) engine, a mobile source chosen from a gasoline car, a gasoline motorcycle, a CNG car, and a CNG motorcycle or a stationary source chosen from an electricity generator and a pumping station.

* * * * *

UNITED STATES PATENT AND TRADEMARK OFFICE
CERTIFICATE OF CORRECTION

PATENT NO. : 11,131,225 B2  
APPLICATION NO. : 16/642707  
DATED : September 28, 2021  
INVENTOR(S) : Liu et al.

Page 1 of 1

It is certified that error appears in the above-identified patent and that said Letters Patent is hereby corrected as shown below:

In the Claims

Claim 6, Column 24, Line 35, "TWO" should read as --TWC--.

Claim 7, Column 24, Line 39, "TWO" should read as --TWC--.

Claim 9, Column 24, Line 44, "TWO" should read as --TWC--.

Claim 10, Column 24, Line 52, "TWO" should read as --TWC--.

Claim 18, Column 26, Line 1, "TWO" should read as --TWC--.

Claim 19, Column 26, Line 6, "TWO" should read as --TWC--.

Claim 19, Column 26, Line 13, "TWO" should read as --TWC--.

Signed and Sealed this  
Twenty-eighth Day of December, 2021

Drew Hirshfeld  
*Performing the Functions and Duties of the  
Under Secretary of Commerce for Intellectual Property and  
Director of the United States Patent and Trademark Office*